(12) United States Patent
Hatsuda et al.

(10) Patent No.: US 6,469,468 B1
(45) Date of Patent: Oct. 22, 2002

(54) SR MOTOR CONTROLLING METHOD AND SR MOTOR HAVING LOW PEAK OF CURRENT FLOWING THEREIN

(75) Inventors: Tadayuki Hatsuda, Kanagawa-ken (JP); Masahiro Tsukamoto, Kanagawa-ken (JP); Kouichirou Yonekura, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 195 days.

(21) Appl. No.: 09/610,699

(22) Filed: Jul. 5, 2000

(30) Foreign Application Priority Data

| Jul. 5, 1999 | (JP) | ............................................. 11-190491 |
| Mar. 17, 2000 | (JP) | ........................................ 2000-075489 |
| Mar. 30, 2000 | (JP) | ........................................ 2000-093102 |

(51) Int. Cl.[7] .............................. H02P 1/46; H02P 3/18; H02P 5/28; H02P 7/36
(52) U.S. Cl. ........................................ 318/701; 318/254
(58) Field of Search ........................ 318/701, 704–705, 318/254

(56) References Cited

U.S. PATENT DOCUMENTS

| 5,166,591 A | 11/1992 | Stephens et al. |
| 5,703,456 A | * 12/1997 | Cox ............................. 318/138 |
| 5,850,133 A | * 12/1998 | Heglund ...................... 318/138 |
| 6,081,083 A | * 6/2000 | Nashiki ....................... 318/138 |

FOREIGN PATENT DOCUMENTS

| EP | 0 948 125 | 10/1999 |
| WO | 99/13563 | 3/1999 |

* cited by examiner

*Primary Examiner*—Marlon T. Fletcher
(74) *Attorney, Agent, or Firm*—McDermott, Will & Emery

(57) ABSTRACT

An SR motor includes a stator having a plurality of salient poles and a rotor having another plurality of salient poles. Windings are wound around the plurality of salient poles and magnetic fields are generated in the plurality of salient poles. The number of salient poles of the rotor is determined depending upon a number of the salient poles of the stator. A supply mode for supplying power from a power supply to the windings, a reflux mode for setting both terminals of the windings to an identical potential, and a regenerative mode for recovering an electromotive force generated in the windings into the power supply are executed as the rotor rotates. The reflux mode and the regenerative mode are preferably repeated in a period during which the inductance of the windings is reduced as the rotor rotates.

68 Claims, 19 Drawing Sheets

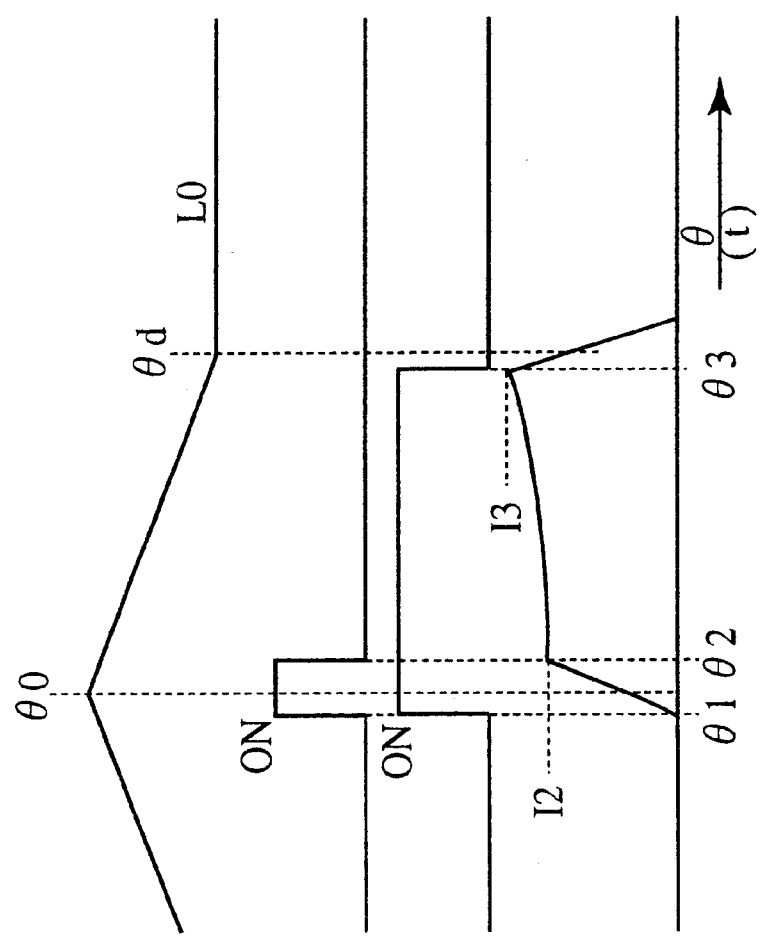
FIG. 6A  INDUCTANCE L
FIG. 6B  SWITCH SW1
FIG. 6C  SWITCH SW2
FIG. 6D  WINDING CURRENT i

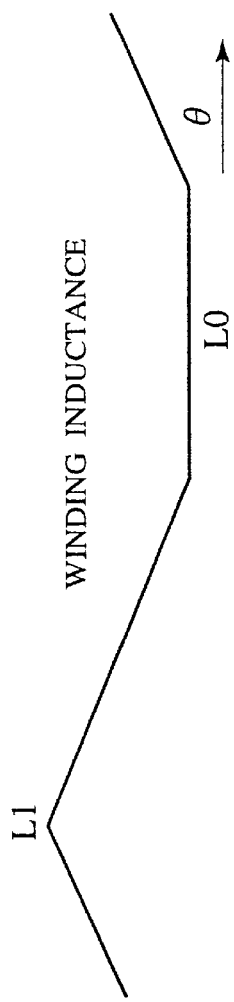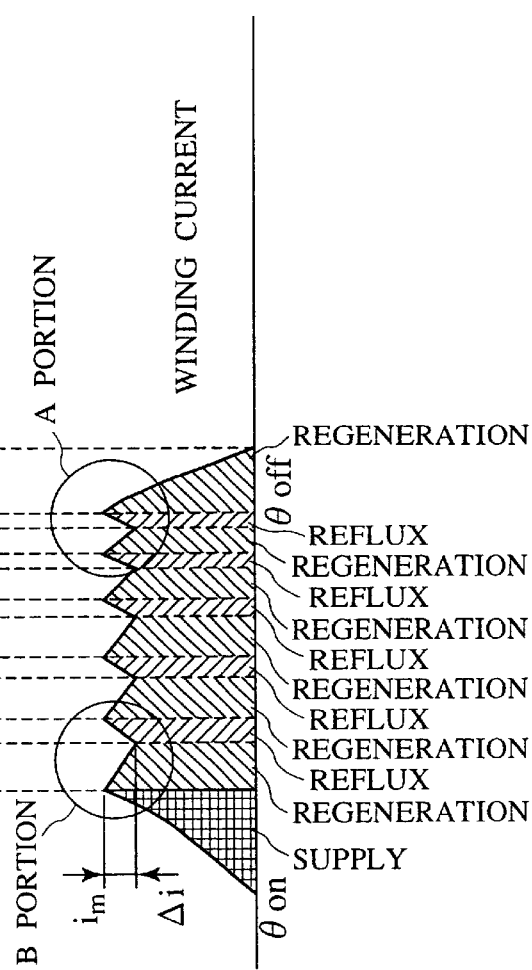
FIG. 7A
FIG. 7B
FIG. 7C

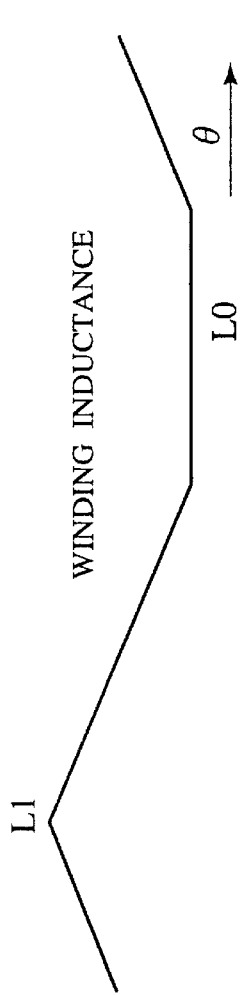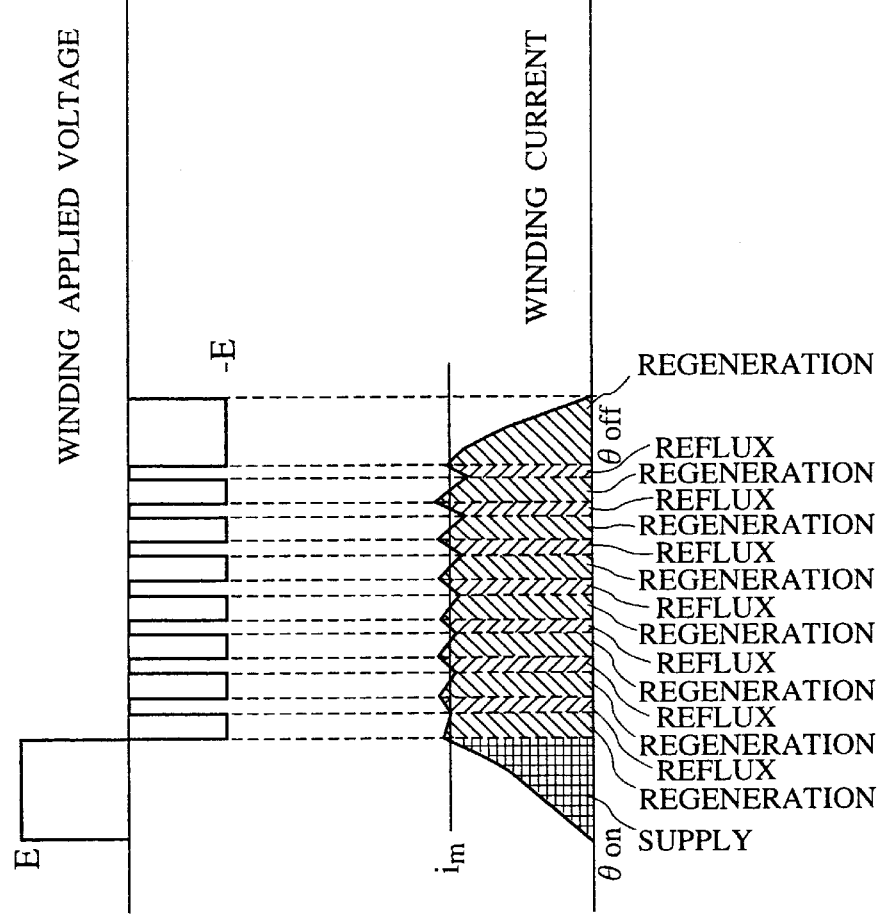
FIG. 19A  FIG. 19B  FIG. 19C

SR MOTOR CONTROLLING METHOD AND SR MOTOR HAVING LOW PEAK OF CURRENT FLOWING THEREIN

BACKGROUND OF THE INVENTION

1. Field of the Invention

The present invention relates to an improved technology of an SR motor (switched reluctance motor).

2. Description of the Related Art

The SR motor has been known as the motor of the type that does not employ the magnet. Such SR motor is constructed by arranging a stator in which a plurality of inwardly projecting salient poles are formed integrally with a cylindrical yoke and a rotor which has a plurality of outwardly projecting salient poles on the same shaft and then fitting winding coils on the salient poles of the stator.

The numbers of the salient poles of the rotor and the salient poles of the stator are set to the even number respectively not to constitute the multiple relationship mutually. For example, the number of the salient poles of the rotor is four while the number of the salient poles of the stator is six, the number of the salient poles of the rotor is six while the number of the salient poles of the stator is eight, the number of the salient poles of the rotor is eight while the number of the salient poles of the stator is twelve, and so forth.

When the current is supplied to a pair of opposing winding coils (plural pairs of winding coils as the case may be) of the stator, the magnetic fluxes directed from the salient poles of the stator to the salient poles of the rotor are generated to attract the salient poles of the rotor to the salient poles of the stator, so that a torque is generated. At this time, when one salient pole of the rotor is positioned so as to face to one salient pole of the stator, positions of remaining salient poles of the rotor are displaced mutually with remaining salient poles of the stator. Therefore, if the current is supplied to the winding coils by selecting the displaced salient poles of the stator sequentially, the salient poles of the rotor are attracted successively to them. Thus, the rotor can be rotated around the shaft.

Also, such SR motor can be functioned as the generator. FIGS. 1A and 1B are circuit diagrams showing a driving circuit in the prior art when the SR motor is used as the generator-motor. This driving circuit is provided to a plurality of windings constituting the same phase (winding sets) of the winding coils, that are fitted on the salient poles of the stator, respectively. For example, in the case of the three-phase motor in which the number of the salient poles of the stator is six and the number of the salient poles of the rotor is four, each phase (U phase, V phase, W phase) is composed of a pair of mutually opposing winding coils. These pairs of winding coils are connected in series to constitute the winding sets respectively, and then the driving circuit is provided to these winding sets respectively. In this disclosure, assume that the winding coil or the winding signifies not only a single winding coil but also a plurality of winding coils constituting the same phase (winding set).

As shown in FIGS. 1A and 1B, a start terminal T1 of a winding coil C is connected to a power supply E via a power device such as a switching device (power transistor) SW1 and also connected to ground via the diode D1. An end terminal T2 of the winding coil C is connected to the power supply E via a diode D2 and also connected to ground via the power device such as a switching device SW2.

FIGS. 2A to 2C are views showing control contents of operations of the switching devices SW1 and SW2, wherein FIG. 2A shows a relationship between a rotation angle of a rotor (abscissa) and an inductance L (ordinate), FIG. 2B shows a relationship between the rotation angle of the rotor (abscissa) and a winding voltage (ordinate), and FIG. 2C shows a relationship between the rotation angle of the rotor (abscissa) and a winding current (ordinate).

When the rotation angle of the rotor becomes a predetermined angle (θon) during a period in which the inductance L is decreasing, the voltage is applied to the winding coil C by turning ON the switching devices SW1 and SW2 simultaneously. At this time, as shown in FIG. 1A, a current flows through a route consisting of the switching device SW1, the winding coil C, and the switching device SW2 and thus energy is supplied from the power supply E to generate the torque.

Then, when the rotation angle of the rotor becomes another predetermined angle (θoff) during the period in which the inductance L is still decreasing, the switching devices SW1 and SW2 are turned OFF simultaneously. At this time, as shown in FIG. 1B, a current flows through a route consisting of the diode D1, the winding coil C, the diode D2 due to an electromotive force caused in the winding coil C to return the energy to the power supply E. Regenerative energy can be increased larger than supply energy by controlling the operations of the switching devices SW1 and SW2 in this manner, whereby the SR motor can be operated as the generator.

However, according to the controlling method in the prior art, the large current is caused to flow because the electromotive force is small, particularly in the low rotational range. As a result, there is such a problem that, since the power device having a large current capacity must be employed as the power device containing the switching device, cost is increased and the size of the device becomes large. Also, there is such another problem that copper loss of the winding is increased and thus the operation of the SR motor becomes ineffective. In addition, there is such still another problem that torque ripple and flutter is also increased correspondingly, since current extremely increases.

SUMMARY OF THE INVENTION

The present invention has been made in light of the above problems in the prior art, and it is an object of the present invention to provide an SR motor controlling method and an SR motor, which are capable of achieving highly effectively the reduction in cost and the improvement in performance.

In order to solve the above problems, according to an aspect of the present invention, there is provided a method of controlling an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the method comprising: executing, changeably as the rotor rotates, a supply mode for supplying power from a power supply to the windings, a reflux mode for setting both terminals of the windings to an identical potential, and a regenerative mode for recovering an electromotive force generated in the windings into the power supply.

In a preferred embodiment of the present invention, the supply mode, the reflux mode and the regenerative mode are executed in that order.

In a preferred embodiment of the present invention, after the supply mode is executed, a repetitive mode during which the regenerative mode and the reflux mode are repeated alternatively is executed.

In a preferred embodiment of the present invention, after a first supply mode is executed, a first repetitive mode during which the regenerative mode and a second supply mode are repeated alternatively and a second repetitive mode during which the regenerative mode and the reflux mode are repeated alternatively are mixedly executed.

In order to solve the above problems, according to another aspect of the present invention, there is provided a method of controlling an SR motor which includes a stator having a plurality of salient poles, windings wound around the plurality of salient poles and generating magnetic fields in the plurality of salient poles, and a rotor having another plurality of salient poles a number of the salient poles of the rotor being determined depending upon a number of the salient poles of the stator, the method comprising: executing a first supply mode for supplying power from a power supply to the windings; and then executing a repetitive mode during which the regenerative mode for recovering an electromotive force generated in the windings into the power supply and a second supply mode for supplying the power from the power supply to the windings are repeated alternatively.

In order to solve the above problems, according to still another aspect of the present invention, there is provide an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the SR motor comprising: a first switch configured to connect selectively start terminals of the windings to one polarity of a power supply; a second switch configured to connect selectively end terminals of the windings to other polarity of the power supply; a first diode interposed between the start terminals of the windings and the other polarity of the power supply, and configured to flow a current only in a direction toward the start terminals; a second diode interposed between the end terminals of the windings and one polarity of the power supply, and configured to flow the current only in a direction toward one polarity of the power supply; and a controller configured to control to execute, changeably as the rotor rotates, a supply mode in which the first switch and the second switch are connected simultaneously, a reflux mode in which one of the first switch and the second switch is connected and other of them is cut off, and a regenerative mode in which the first switch and the second switch are cut off simultaneously.

In a preferred embodiment of the present invention, the supply mode, the reflux mode and the regenerative mode are executed in that order.

In a preferred embodiment of the present invention, after the supply mode is executed, a repetitive mode during which the regenerative mode and the reflux mode are repeated alternatively is executed.

In a preferred embodiment of the present invention, after a first supply mode is executed, a first repetitive mode during which the regenerative mode and a second supply mode are repeated alternatively and a second repetitive mode during which the regenerative mode and the reflux mode are repeated alternatively are mixedly executed.

In order to solve the above problems, according to yet another aspect of the present invention, there is provide an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the SR motor comprising: a first switch configured to connect selectively start terminals of the windings to one polarity of a power supply; a second switch configured to connect selectively end terminals of the windings to other polarity of the power supply; a first diode interposed between the start terminals of the windings and the other polarity of the power supply, and configured to flow a current only in a direction toward the start terminals; a second diode interposed between the end terminals of the windings and one polarity of the power supply, and configured to flow the current only in a direction toward one polarity of the power supply; and a controller configured to control to execute a first supply mode in which the first switch and the second switch are connected simultaneously, and then execute a repetitive mode in which the first switch and the second switch are cut off simultaneously and a second supply mode in which the first switch and the second switch are connected simultaneously.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A and 1B are circuit diagrams showing a configuration of an SR motor driving circuit in the prior art, wherein FIG. 1A shows a supply mode, and FIG. 1B shows a regenerative mode;

FIGS. 2A to 2C are views showing execution timings of respective modes of the SR motor in the prior art, wherein FIG. 2A shows a relationship between a rotation angle of a rotor and an inductance, FIG. 2B shows a relationship between the rotation angle of the rotor and a winding voltage, and FIG. 2C shows a relationship between the rotation angle of the rotor and a winding current;

FIGS. 3A to 3D are graphs showing simulation results of the SR motor in the prior art, wherein FIG. 3A shows a relationship between the rotation angle of the rotor and the inductance, FIG. 3B shows a relationship between the rotation angle of the rotor and the winding voltage, FIG. 3C shows a relationship between the rotation angle of the rotor and the winding current, and FIG. 3D shows a relationship between the rotation angle of the rotor and a torque;

FIGS. 5A to 5C are circuit diagrams showing a configuration of an SR motor driving circuit according to the first embodiment of the present invention, wherein FIG. 5A shows a supply mode, FIG. 5B shows a regenerative mode, and FIG. 5C shows a reflux mode;

FIGS. 6A to 6D are views showing execution timings of respective modes, wherein FIG. 6A shows a relationship between a rotation angle of a rotor (abscissa) and an inductance (ordinate), FIG. 6B shows a relationship between a rotation angle of a rotor (abscissa) and an operation (on, off) of the switching device SW1 (ordinate), FIG. 6C shows a relationship between a rotation angle of a rotor (abscissa) and an operation (on, off) of the switching device SW2

(ordinate), and FIG. 6D shows relationship between a rotation angle of a rotor (abscissa) and the winding current I;

FIGS. 7A to 7C are views showing execution timings of respective modes of the SR motor driving circuit according to the second embodiment of the present invention, wherein FIG. 7A shows a relationship between a rotation angle of a rotor and an inductance, FIG. 7B shows a relationship between the rotation angle of the rotor and a winding voltage, and FIG. 7C shows a relationship between the rotation angle of the rotor and a winding current;

FIGS. 8A to 8D are graphs showing simulation results of the SR motor driving circuit according to the second embodiment of the present invention, wherein FIG. 8A shows a relationship between the rotation angle of the rotor and the inductance, FIG. 8B shows a relationship between the rotation angle of the rotor and the winding voltage, FIG. 8C shows a relationship between the rotation angle of the rotor and the winding current, and FIG. 8D shows a relationship between the rotation angle of the rotor and a torque;

FIGS. 11A to 11C are views showing execution timings of respective modes of the SR motor driving circuit according to the third embodiment of the present invention, wherein FIG. 11A shows a relationship between a rotation angle of a rotor and an inductance, FIG. 11B shows a relationship between the rotation angle of the rotor and a winding voltage, and FIG. 11C shows a relationship between the rotation angle of the rotor and a winding current;

FIGS. 12A to 12C are views showing execution timings of respective modes of an SR motor driving circuit according to a fourth embodiment of the present invention, wherein FIG. 12A shows a relationship between a rotation angle of a rotor and an inductance, FIG. 12B shows a relationship between the rotation angle of the rotor and a winding voltage, and FIG. 12C shows a relationship between the rotation angle of the rotor and a winding current;

FIGS. 13A to 13C are views showing execution timings in respective modes of an SR motor driving circuit according to a fifth embodiment of the present invention, wherein FIG. 13A shows a relationship between a rotation angle of a rotor and an inductance, FIG. 13B shows a relationship between the rotation angle of the rotor and a winding voltage, and FIG. 13C shows a relationship between the rotation angle of the rotor and a winding current;

FIGS. 14A and 14B are views showing start timings of the initial supply mode according to a sixth embodiment of the present invention, wherein FIG. 14A shows a relationship between a rotation angle of a rotor (abscissa) and an inductance L (ordinate), and FIG. 14B shows a relationship between the rotation angle of the rotor (abscissa) and a winding current (ordinate);

FIGS. 16A and 16B are views showing start timings of the last regenerative mode in the sixth embodiment of the present invention, wherein FIG. 16A shows a relationship between the rotation angle of the rotor (abscissa) and the inductance L (ordinate), and FIG. 16B shows a relationship between the rotation angle of the rotor (abscissa) and the winding current (ordinate);

FIGS. 19A to 19C are views showing the case where PWM current control is carried out in the third embodiment of the present invention, wherein FIG. 19A shows a relationship between a rotation angle of a rotor and an inductance, FIG. 19B shows a relationship between the rotation angle of the rotor and a winding voltage, and FIG. 19C shows a relationship between the rotation angle of the rotor and a winding current.

DETAILED DESCRIPTION OF THE PREFERRED EMBODIMENTS

Embodiments of the present invention will be explained in detail with reference to the accompanying drawings hereinafter.

First Embodiment

Figure 4:
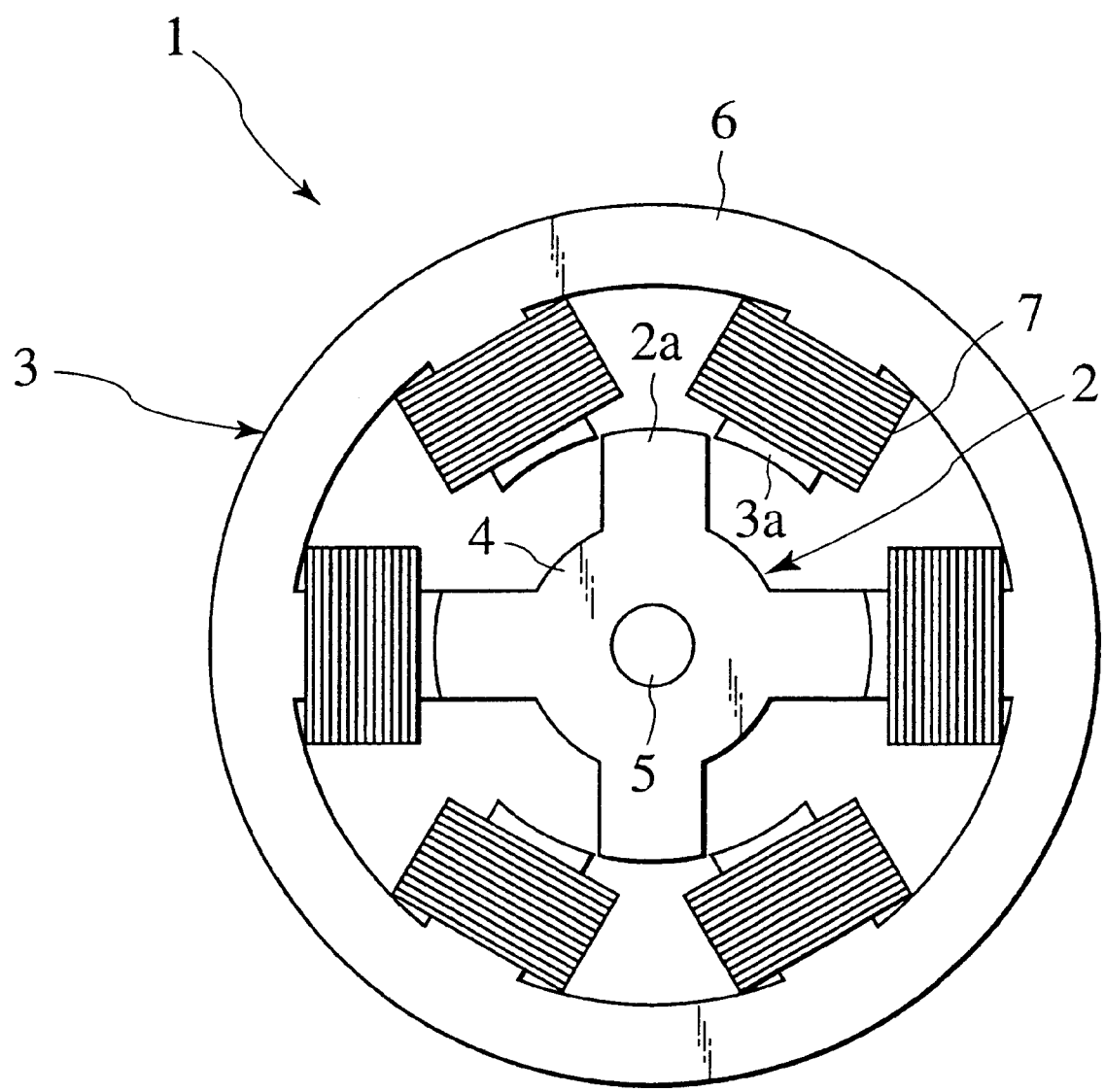
FIG. 4 is a plan view showing a configuration of an SR motor according to a first embodiment of the present invention.
Figure 5C:
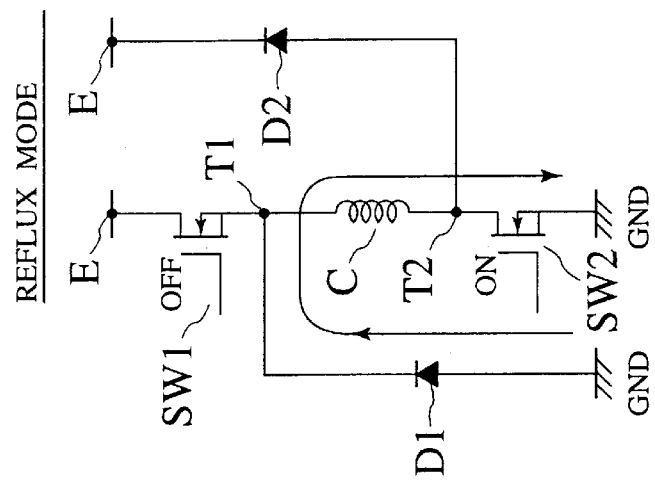
Figure 5B:
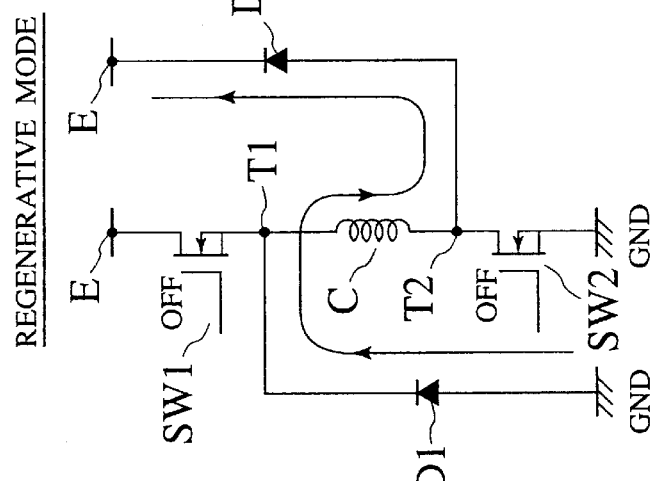
Figure 5A:
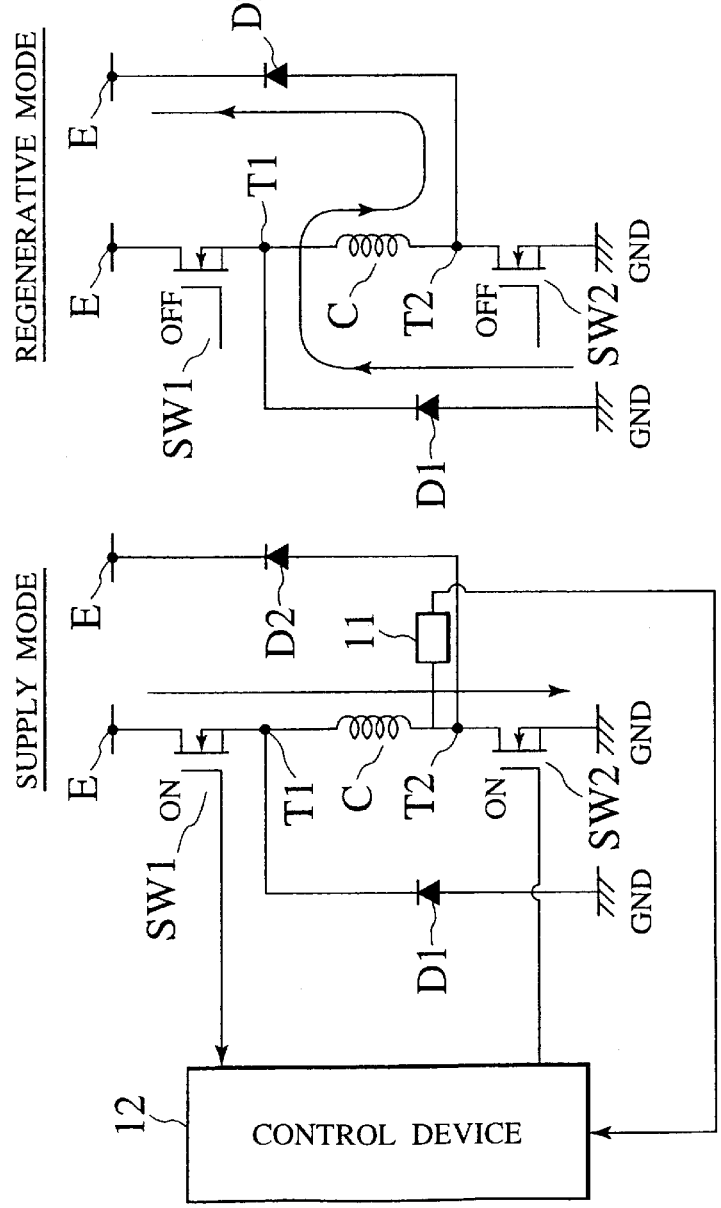

A first embodiment of the present invention will be explained with reference to figures hereunder. FIG. 4 is a plan view showing a configuration of an SR motor (switched reluctance motor) according to a first embodiment of the present invention. FIGS. 5A to 5C are circuit diagrams showing a configuration of an SR motor driving circuit according to the first embodiment of the present invention, wherein FIG. 5A shows a supply mode, FIG. 5B shows a regenerative mode, and FIG. 5C shows a reflux mode. The SR motor 1 is a three-phase motor in which the number of salient poles of the stator is set to six and the number of salient poles of the rotor is set to four. For example, the SR motor 1 is the generator-motor that can also function as the generator directly coupled with an engine of a vehicle.

First, FIG. 4 is referred to. The SR motor 1 is constructed to comprise a rotor 2, a stator 3, a motor housing (not shown) for containing them, etc.

The rotor 2 is constructed by inserting an output shaft 5 into a through hole formed on a center of a, rotor core 4, that has a plurality of (four in this embodiment) salient poles 2a, and then fixing them integrally. The output shaft 5 is supported to the motor housing via bearings. In this embodiment, the rotor core 4 is constructed by laminating integrally a plurality of magnetic steel plates that are stamped out by the punching machine. The number of rotations (rpm) of the output shaft 5 per unit time is counted by a number-of-rotations detecting unit (not shown). The angle of rotations of the output shaft 5 is constantly detected by an angle-of-rotations detecting unit.

The stator 3 is constructed to include a stator core 6 and a plurality of winding coils 7. The stator core 6 is constructed by providing integrally a plurality of (six in this embodiment) salient poles 3a that protrude toward the inside of an almost cylindrical yoke portion in the radial direction. In this embodiment, the stator core 6 is constructed by laminating integrally a plurality of magnetic steel plates that are stamped out by the punching machine. The stator 3 is fixed to the inside of the motor housing.

The winding coils 7 are fitted onto six salient poles of the stator core 6 respectively. A pair of opposing winding coils 7 are connected in series to constitute a winding set, and respective phases (U phase, V phase, W phase) are constructed by these three winding sets. The winding coils 7 are wound directly onto the salient poles 3a of the stator core 6, otherwise are wound onto bobbins formed of resin respectively and then fitted onto the salient poles 3a. The rotor 2 is inserted into the stator 3 and then positioned coaxially to have a predetermined gap between the salient poles 2a of the rotor 2 and the salient poles 3a of the stator 3.

When the current is supplied to the winding coils 7, the magnetic fluxes directed from the salient poles 3a of the stator 3 to the salient poles 2a of the rotor 2 are generated to attract the neighboring salient poles 2a of the rotor 2 to the salient poles 3a of the stator 3, whereby the torque is generated. At this time, when one salient pole 2a of the rotor 2 is positioned to face to one salient pole 3a of the stator 3, positions of remaining salient poles 2a of the rotor 2 are displaced mutually with remaining salient poles 3a of the stator 3. Therefore, if the current is supplied to the winding coils by selecting the displaced salient poles 3a of the stator 3 sequentially, i.e., if the current is supplied sequentially to the winding coil constituting the U phase, the winding coil constituting the V phase, and the winding coil constituting the W phase, the salient poles 2a of the rotor 2 are attracted successively to the salient poles 3a of the stator 3. Thus, the rotor 2 can be rotated around the shaft.

The SR motor driving circuit is constructed as shown in FIGS. 5A to 5C. In the following description, the driving circuit of the winding set constituting the U phase will be explained. In this case, the driving circuits of the winding sets constituting the V, W phases have the similar configuration.

A start terminal T1 of the winding set C, that consists of a pair of winding coils 7 constituting the U phase, is connected to the power supply E (e.g., (+) pole of a battery for a vehicle) via a power device such as a switching device (power transistor) SW1, and also connected to ground ((−) pole of the battery) via a diode D1. An end terminal T2 of the winding set C is connected to the power supply E via a diode D2, and also connected to ground via a similar power device such as a switching device SW2.

A current sensor 11 is provided to the end terminal T2 of the winding set C. Based on a detected angle of the angle-of-rotations detecting unit and a detected current of the current sensor, etc., operations of the switching devices SW1, SW2 are controlled by a control device 12 respectively.

The control device 12 of this embodiment executes appropriately three control modes, i.e., a supply mode, a regenerative mode, and a reflux mode. The supply mode is a mode which supplies a power to the winding set C, and is a mode that turns ON the switching devices SW1 and SW2 simultaneously, as shown in FIG. 5A. According to the supply mode, the current flows through a route consisting of the switching device SW1, the winding set C, and the switching device SW2, and thus the energy is supplied from the power supply E to generate the torque during this period.

The regenerative mode is a mode in which the electromotive force generated in the winding set C is withdrawn. As shown in FIG. 5B, the switching devices SW1 and SW2 are turned OFF simultaneously in the regenerative mode. According to the regenerative mode, the current flows through a route consisting of the diode D1, the winding set C, and the diode D2, and thus the energy is returned to the power supply E in this mode. If the regenerative energy is increased larger than the supply energy by setting appropriately ON/OFF timings of the switching devices SW1 and SW2, i.e., by executing appropriately the supply mode and the regenerative mode, this SR motor can be operated as the generator.

The reflux mode is a mode which is newly provided by the present invention and in which both terminals of the winding set C are set to the same potential. That is, as shown in FIG. 5C, the switching device SW2 is set to its ON and the switching device SW1 is set to its OFF in this mode. In FIG. 5C, according to the reflux mode, the current flows through a route consisting of the diode D1, the winding set C, and the switching device SW2, and thus there is no revenue and expenditure of the energy in this mode because the current is returned to ground. In this case, the reflux mode may be achieved by setting the switching device SW1 to its ON and setting the switching device SW2 to its OFF.

FIGS. 6A to 6D are views showing execution timings of respective modes, wherein FIG. 6A shows a relationship between a rotation angle of a rotor (abscissa) and an inductance (ordinate), FIG. 6B shows a relationship between a rotation angle of a rotor (abscissa) and an operation (on, off) of the switching device SW1 (ordinate), FIG. 6C shows a relationship between a rotation angle of a rotor (abscissa) and an operation (on, off) of the switching device SW2 (ordinate), and FIG. 6D shows relationship between a rotation angle of a rotor (abscissa) and the winding current I.

As shown in these figures, according to the first embodiment, the supply mode is started by turning ON the switching devices SW1 and SW2 simultaneously when the rotor is positioned at a predetermined rotation angle θon in the rising latter half period of the inductance L. Thus, the current flowing through the winding set C is increased. Then, the reflux mode replaces the supply mode by turning OFF the switching device SW1 while keeping the switching device SW2 in its ON state as it is when the inductance L is turned to the reduction (rotation angle η0 of the rotor) or when the rotor is positioned at a predetermined rotation angle θ2 at the beginnings of the falling period of the inductance L.

Next, the regenerative mode is started by turning OFF the switching device SW2 while keeping the switching device SW1 in its OFF state as it is when the rotor is positioned at a predetermined rotation angle θ3 (at a point of time prior to a point of time when the inductance L is turned from the falling to the plateau). The regenerative mode continues until the current becomes zero.

The more detail explanations will be provided hereinunder assuming that the rotor is drove at a constant rotation rate by an external control. IF the switching devices SW1 and SW2 are simultaneously turned ON when the rotor is positioned at a predetermined rotation angle θ1 and no current is flowing through the winding coils, the current starts to rise. The current is represented by the following equation.

$$V = Ri + L(di/dt) + i\omega(dL/d\theta) \quad (1)$$
$$= (R + \omega(dL/d\theta))I + L(di/dt)$$

where the winding inter-terminal voltage is V, the winding resistance is R, the winding current is i, the rate of change of the current is (di/dt), the number of rotations of the rotor per unit time is ω, the winding inductance is L and the rate of change of the inductance is (dL/dθ).

Since it is generally known that the inductance L relative to the rotation angle of an SR motor can be approximated to linear lines of chopping wave as shown in FIG. 6A, ω(dL/dθ) shows three processes of a process in which the inductance linearly rises, a process in which the inductance linearly falls and a process in which the inductance is almost constant, in the condition that the number of rotations of the rotor per unit time is constant (except ω=0).

As described before, if the switching devices SW1 and SW2 simultaneously turns ON at a rotation angle of θ=θ1

(θ1<θ0) of the rotor, (dL/dθ) in the equation (1) has a positive value in an early period of excitation, which means apparent increasing of resistance of the circuit thereof, therefore the current I gently rises. Then, when the rotation angle becomes θ>θ0 after the corresponding rotation of the rotor, (dL/dθ) has a negative value conversely, which means apparent decreasing of resistance of the circuit thereof, therefore the current I prominently rises. Particularly, if ω has a value which makes (R+ω(dL/dθ)) negative, which means that apparently the resistance value is negative and thus increasing of current causes increasing of the value of L(di/dt), therefore the current continues to rise.

Thereafter, if the switching device SW1 is turned OFF when the rotation angle θ becomes θ2, the current returns as shown in FIG. 6C.

In the reflux mode, the winding terminal voltage is 0 V. Therefore, "0" is substituted to V in the equation (1) and thus the following equation (2) is obtained.

$$L(di/dt) = -(R + \omega(dL/d\theta))I \quad (2)$$

Considering into account that all of the inductance L, the winding resistance L, the number of rotations of the rotor per unit time is ω, and the current I is positive and only (dL/dθ) is negative, the current I increases while returning, as shown in FIG. 6D, only in the condition that ω satisfies (R+ω(dL/dθ))<0. This means that the winding converts the energy required for the rotations from an external driving source which drives the rotor at a constant rotation rate, into electric energy to store it therein.

Thereafter, if the switching device SW2 that has been ON is turned OFF when the rotation angle θ becomes θ3, the current flowing through the winding is regenerated into a power supply.

If θ3 is set to be larger than the angle θd at which the inductance L becomes the constant value L0, the current which has increased turns to decreasing because the region where (dL/dθ) in the equation (2) is 0 is included. This makes generation amount of electric energy decrease, which should be avoided.

As described above, according to this embodiment, the reflux mode lies between the supply mode and the regenerative mode. Therefore, even the rotation number per unit time of the rotor is low, prominent increase of the winding current is prevented. For this reason, as constituent parts of the driving circuit such as the power device containing the switching devices SW1, SW2, the diodes D1, D2, and others, parts having the small current capacity can be employed. As a result, since normally such parts are inexpensive rather than the parts having the large current capacity, reduction in cost and size of the SR motor can be achieved.

Also, if the reflux mode is executed after the execution of the supply mode, the rotation energy of the rotor is accumulated in the winding as the electric energy, and the current flowing through the winding gently rises without consuming electric power as shown in FIG. 6D. For this reason, in the regenerative mode after that, the electric energy the amount thereof is more by the rising is obtained.

Particularly, in this embodiment, the supply mode starts before the peak (θ0) of the inductance of the winding during the rising period of the inductance along with the rotation of the rotor, and the reflux mode starts at the beginnings of the falling period of the inductance of the winding along with the rotation of the rotor. Therefore almost all the range in which the inductance falls as the rotor rotates and thus electric energy can be inherently generated can be utilized to increase the generation amount of electric energy. Further, the regenerative mode starts before the end of the falling period of the inductance of winding along with the rotation of the rotor so that the reduction of the generation amount of electric energy can be avoided.

In this embodiment, the rotation angle θ of the rotor is always detected, and the supply mode starts when the rotation angle θ of the rotor reaches the predetermined angle θ1, the reflux mode replaces the supply mode when the rotation angle θ reaches the predetermined angle θ2, and the regenerative mode replaces the reflux mode when the rotation angle θ reaches the predetermined angle θ3. Another criterion can be, however, applied such that the reflux mode replaces the supply mode when winding current detected by a current detector reaches the predetermined first current value I2, and the regenerative mode replaces the reflux mode when the winding current reaches the predetermined second current I3. The second current value I3 may be set to be larger than the first current value I2.

Second Embodiment

A second embodiment of the present invention will be explained with reference to figures hereunder. The configurations of the SR motor and the SR motor driving circuit according to the second embodiment of the present invention are same as those of the first embodiment as shown in FIG. 4 and FIGS. 5A to 5C.

FIGS. 7A to 7C are views showing execution timings of respective modes, wherein FIG. 7A shows a relationship between a rotation angle of a rotor (abscissa) and an inductance (ordinate), FIG. 7B shows a relationship between the rotation angle of the rotor (abscissa) and a winding voltage (ordinate), and FIG. 7C shows a relationship between the rotation angle of the rotor (abscissa) and a winding current (ordinate).

As shown in FIGS. 7A to 7C, in the second embodiment, the supply mode is started by turning ON the switching devices SW1 and SW2 simultaneously when the rotor reaches a predetermined rotation angle θ at the end of the rising period of the inductance L. Thus, the current flowing through the winding set C is increased. Then, the regenerative mode is executed by turning OFF the switching devices SW1 and SW2 simultaneously when the inductance L is turned to the reduction or when the winding current detected by the above current sensor (detected current) reaches a predetermined upper limit value $i_m$ at a point of time in the succeeding falling period. Thus, the winding current is reduced. Then, the reflux mode is executed by turning ON the switching device SW2 while keeping the switching device SW1 in its OFF state as it is when the detected current detected by the above current sensor comes up to a predetermined lower limit value. Thus, the winding current is increased once again.

In the following, when the detected current reaches the predetermined upper limit value and the predetermined lower limit value respectively, the reflux mode and the regenerative mode are alternatively repeated. Then, when the rotor is positioned at a predetermined rotation angle θoff (at a point of time prior to a point of time when the inductance L is turned from the falling to the plateau), repetitive control of the regenerative mode and the reflux mode is completed. After this, the regenerative mode continues until the current becomes zero.

According to this embodiment, since the regenerative mode and the reflux mode are alternatively repeated such that the winding current is held in the range between the predetermined upper limit value and the predetermined lower limit value after the supply mode is executed, the prominent increase of the winding current can be prevented even if the number of rotations of the rotor is in the low rotation range, and the winding current can be held below the predetermined value. Therefore, as constituent parts of the driving circuit such as the power device containing the switching devices SW1, SW2, the diodes D1, D2, and others, parts having the small current capacity can be employed. As a result, since normally such parts are inexpensive rather than the parts having the large current capacity, reduction in cost of the SR motor can be achieved.

In addition, the winding current is reduced by the execution of the regenerative mode, but the winding current is increased (recovered) by the execution of the reflux mode. Therefore, the winding current can be held within the predetermined range (range between the upper limit value and the lower limit value), and thus the output is not reduced or the output can be increased higher even if the current peak is suppressed low.

In addition, in the above embodiment, since the supply mode is executed in the rising latter half period of the winding inductance L and also the regenerative mode and the reflux mode are executed successively in the falling period of the winding inductance L, an efficiency of power generation becomes high.

Here, the circuit equation in the supply mode is given by $$L(di/dt)=V-Ri-(dL/d\theta)i\omega \qquad (3)$$

where the winding inter-terminal voltage is V, the winding resistance is R, the winding current is i, the rate of change of the current is (di/dt), the number of rotations of the rotor per unit time is ω, the winding inductance is L, and the rate of change of the inductance is (dL/dθ).

In the reflux mode, since the voltage applied across the winding is 0 [V], the circuit equation is given by $$L(di/dt)=-(R+(dL/d\theta)i$$

by substituting V=0 into Eq.(3). At this time, the current is increased if $$-(R+(dL/d\theta)\omega)i>0 \qquad (4)$$

Since i has only a positive value structurally and the reflux mode is executed in the falling period of the winding inductance, (dL/dθ) becomes negative.

Accordingly, the inequality in Eq.(4) is given by $$\omega>-R/(dL/d\theta) \qquad (5)$$

This inequality in Eq.(5) yields the lowest number-of-rotations condition to increase the current in the reflux mode.

If quite normal values R=0.2Ω and (dL/dθ)=−(10 mH−1 mH)/(30 degrees), for the purpose of reference, are substituted into the in equality in Eq.(5), ω>55 rpm is given. Thus, the SR motor can be employed from the very low rotation range.

Then, in the regenerative mode, the voltage applied between both terminals of the winding denotes the backward bias. Therefore, substituting V=−E (E is the power supply voltage) into Eq.(3) yields $$L(di/dt)=-E-(R+(dL/d\theta)\omega)i$$

Then, the current can be reduced if $$-E-(R+(dL/d\theta)\omega)i<0 \qquad (6)$$

In other words, if the left side of the inequality in Eq.(6) is positive, the current is continued to increase. Thus, it is impossible to control the SR motor.

Now, if it is assumed that the condition defined by Eq.(4) can be satisfied, the inequality $$i<-E/(R+(dL/d\theta)\omega) \qquad (7)$$

can be given. This Eq.(7) yields the maximum current condition to reduce the current in the regenerative mode. If quite normal values E=100 V and ω=1000 rpm, for the purpose of reference, are substituted into Eq.(7), the winding current i<58 (A) can be given.

Figure 1A:
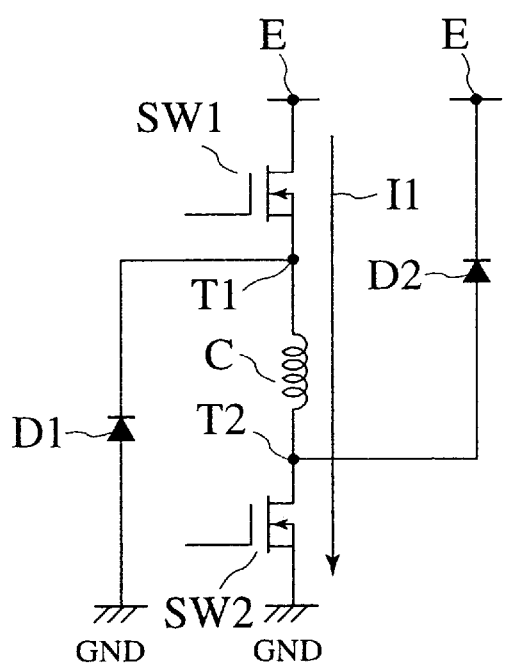
Figure 1B:
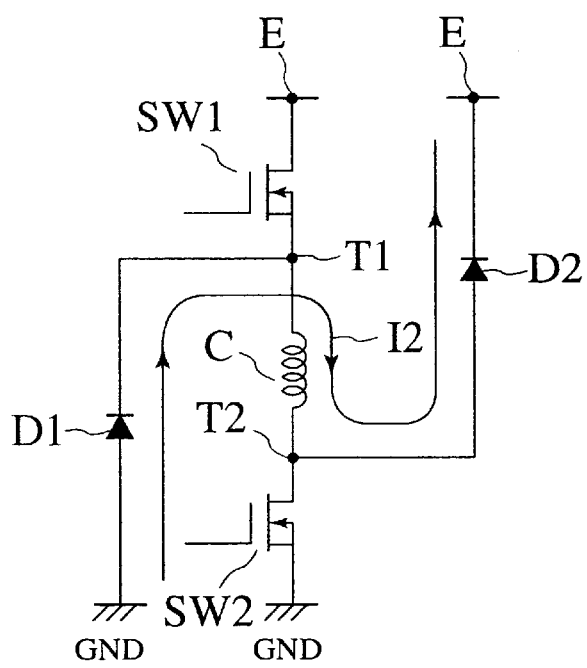
Figure 2A:
Figure 2B:
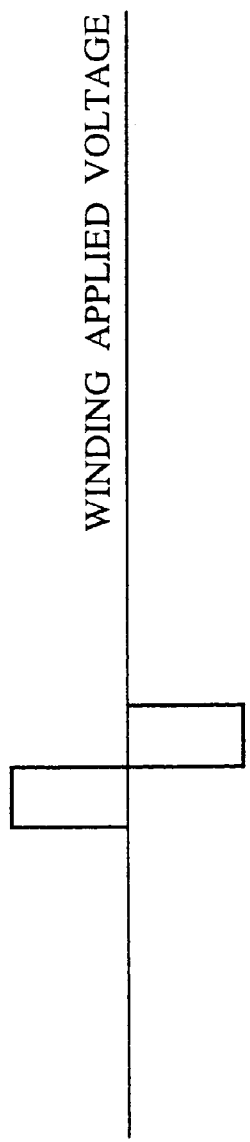
Figure 2C:
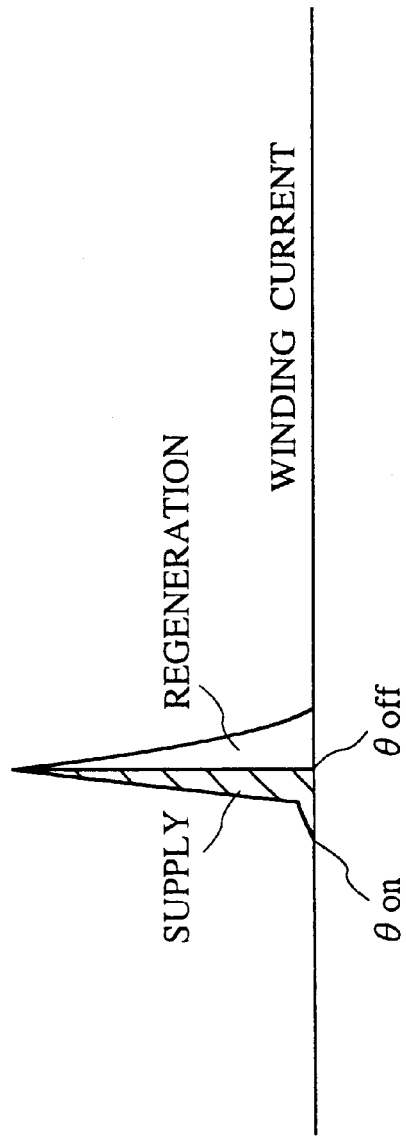
Figure 3A:
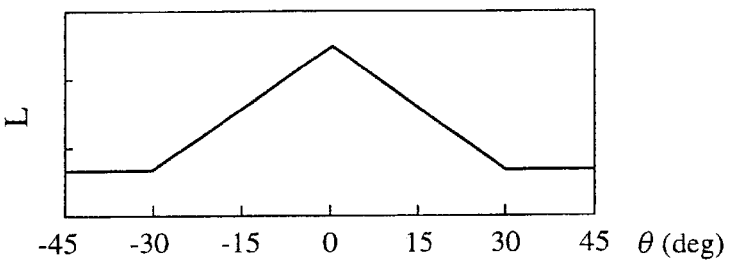
Figure 3B:
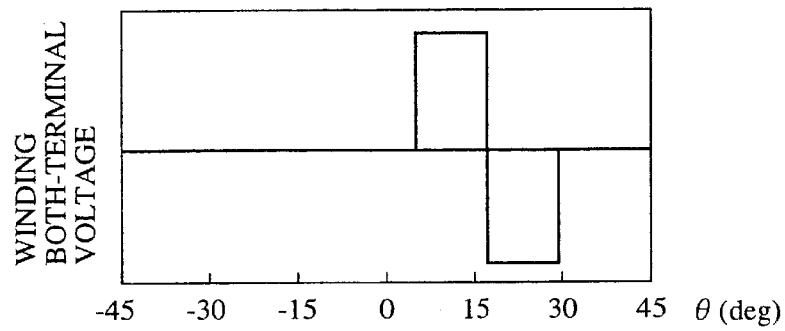
Figure 3C:
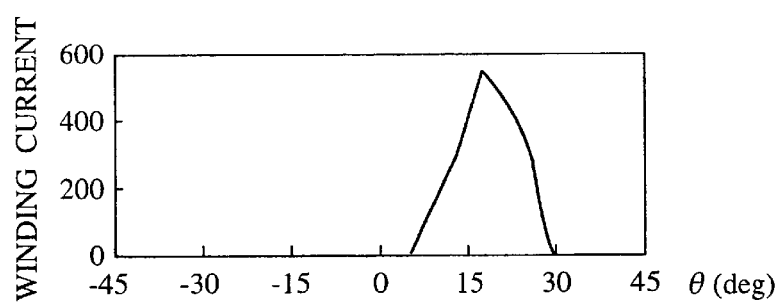
Figure 3D:
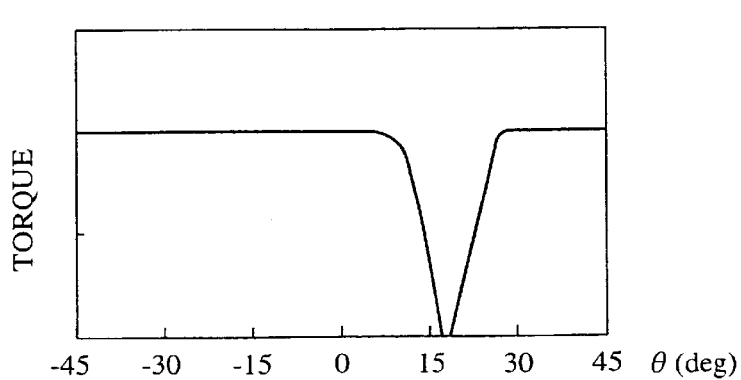
Figure 8A:
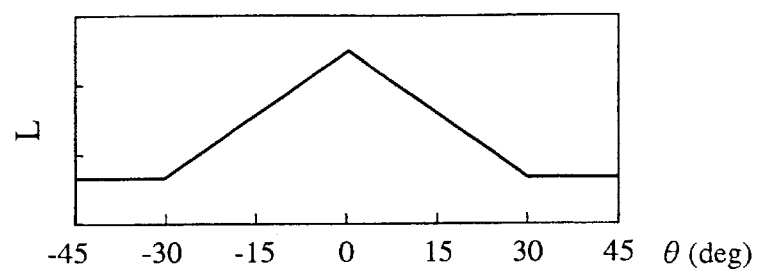
Figure 8B:
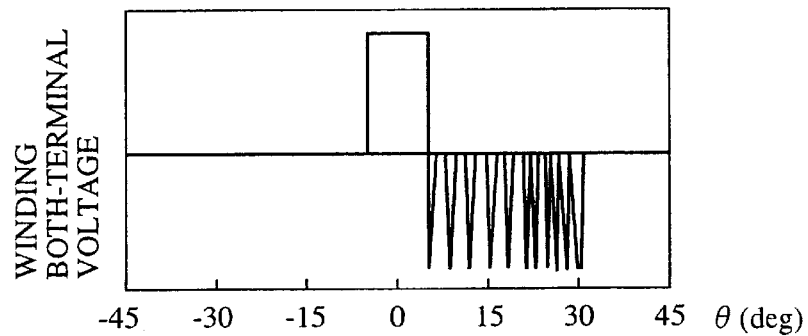
Figure 8C:
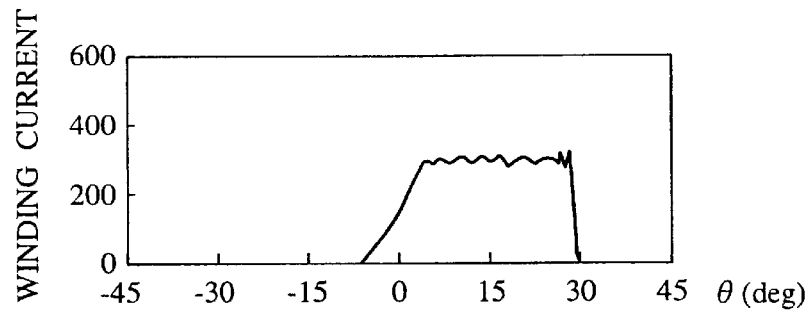
Figure 8D:
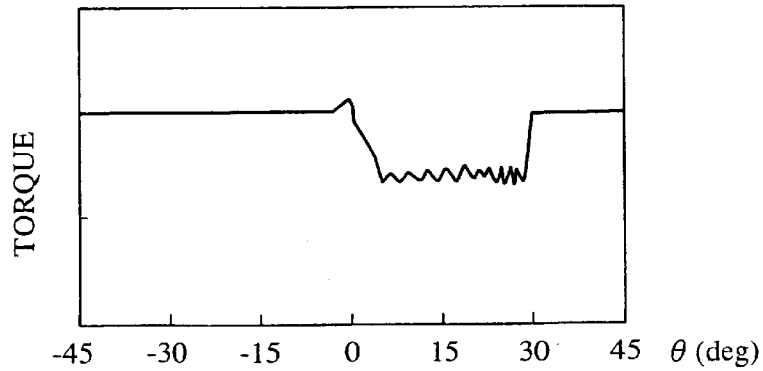

FIGS. 8A to 8D are graphs showing simulation results obtained when the configuration according to the second embodiment is employed. FIGS. 3A to 3D are graphs showing simulation results obtained when the configuration in the prior art is employed in contrast to the above. FIGS. 8A and 3A show a relationship between the rotation angle of the rotor (abscissa) and the inductance (ordinate), FIGS. 8B and 3B show a relationship between the rotation angle of the rotor (abscissa) and the winding voltage (ordinate), FIGS. 8C and 3C show a relationship between the rotation angle of the rotor (abscissa) and the winding current (ordinate), and FIGS. 8D and 3D show a relationship between the rotation angle of the rotor (abscissa) and a torque (ordinate).

These simulation results are obtained at the time of 700 rpm/1 kW output. In order to attain the same output, the current peak can be considerably reduced like 300 A rather than 540 A in the prior art. Accordingly, it can be understood that the peak of the torque is reduced and becomes uniform and thus a torque ripple can be reduced.

Next, the upper limit value $i_m$ and the lower limit value that are current values used to control a mode switching timing during the repeating period of the regenerative mode and the reflux mode will be explained hereunder. In this disclosure, a value corresponding to a difference between the upper limit value and the lower limit value is referred to as a current amplitude Δi.

It is possible to say that the smaller current amplitude Δi is advantageous to the SR motor. The reason for this can be given as follows. That is, the above repetitive control is finished at the point of time when the rotation angle of the rotor reaches θoff after the regenerative mode and the reflux mode have been repeated, and then the regenerative mode is executed until the current is reduced to zero. In this case, it is a matter of course that the range of the current value taken at the instant of θoff is small as the current amplitude Δi becomes small, and therefore variation in a power generation amount in the regenerative mode can be reduced after the rotor has passed through θoff. In addition, if the current amplitude Δi becomes smaller, the torque ripple can be reduced much more and also an average current can be increased, and therefore the power generation amount can be increased correspondingly.

On the contrary, there is a problem that, if the current amplitude Δi is made small, switching frequencies of the switching devices SW1, SW2 become higher. Normally, the maximum value of the switching frequency that is allowable in specifications of the switching device is decided. Thus, if the switching device is operated at the frequency that exceeds the maximum value, the proper operation of the switching device cannot be assured. In the worst case, destruction of the switching device may be brought about.

Accordingly, ideally it is preferable that the current change period in the repetitive period of the regenerative mode and the reflux mode, i.e., a time Δt that correspond to a sum of respective execution times of the regenerative mode and the succeeding reflux mode, should be set to coincide to the minimum switching period (reciprocal of the maximum switching frequency) Δt0 of the switching devices SW1, SW2.

A relationship between the current amplitude $\Delta i$ and the current change period $\Delta t$ in the repeating period can be derived as follows.

That is, the circuit equation of the SR motor is given by $$di/dt = \{V - [R + \omega(dL/d\theta)]i\}/L(\theta) \qquad (8)$$

where the winding inter-terminal voltage is V, the winding resistance is R, the winding current is i, the rate of change of the current is (di/dt), the number of rotations of the rotor per unit time is $\omega$, the winding inductance of the rotor at the rotation angle $\theta$ is $L(\theta)$, and the rate of change of the inductance is $(dL/d\theta)$.

In Eq.(8), assume that $i = i_m$ (constant) because the current amplitude $\Delta i$ is sufficiently small and that $L(\theta) = L_m$ (constant) because the low speed rotation is discussed herein. Thus, the rate of change (di/dt) of the current to the time becomes constant if the number of rotations $\omega$ and the voltage V are decided. In other words, in the regenerative mode (1 is appended as the index), substituting V=-E (E is the power supply voltage) into Eq.(8) yields $$di_1/dt_1 = \{-E - [R + \omega(dL/d\theta)]i_m\}/L_m \qquad (9)$$

In the reflux mode (2 is appended as the index), substituting V=0 into Eq.(8) yields $$di_2/dt_2 = -[R + \omega(dL/d\theta)]i_m/L_m \qquad (10)$$

Since the current amplitude $\Delta i$ at this time is equal in respective modes, $$di_1 = -\Delta i, \ di_2 = \Delta i \qquad (11)$$

are given. Also, the current change period (time period corresponding to a sum of execution times of the regenerative mode and the following reflux mode) $\Delta t$ in the repeating period is given by $$\Delta t = dt_1 + dt_2 \qquad (12)$$

Therefore, $$\Delta t = \Delta i \cdot E L_m / (\alpha(E - \alpha)) \qquad (13)$$

can be derived based on Eqs.(9) to (12), where $$\alpha = -(R + \omega(dL/d\theta))i_m$$

If the current amplitude $\Delta i$ which can provide $\Delta t$ shown in Eq.(13) to satisfy $$\Delta t \geq \Delta t_o \qquad (14)$$

with respect to the minimum switching period $\Delta t0$ (reciprocal of the maximum switching frequency) of the switching devices SW1, SW2 is calculated and then the upper limit value and the lower limit value of the current to control the repeating operation are set based on this current amplitude $\Delta i$, the switching operations of the switching devices SW1, SW2 do not exceed the limits and thus the problems of the breakdown, etc. are not caused at all.

In this case, it is preferable that $\Delta i$ should be set to satisfy the equality sign in Eq.(14). This is because the breakdown of the switching devices SW1, SW2 is never caused, variation in the power generation amount can be reduced as small as possible, and the power generation amount can be increased as much as possible.

Then, decision of the inductance (instantaneous inductance) $L_m$ in Eq.(13) will be explained hereunder. As shown in FIGS. 7A to 7C, if the current amplitude $\Delta i$ in the repeating period of the regenerative mode and the reflux mode is set constant as described above, the switching frequency is increased with the lapse of time in the period when the winding inductance L is reduced as the rotor rotates. That is, the switching frequency reaches a maximum in the last one period (see the A portion in FIG. 7C) of the current change in the repeating period. This is because the inductance L can be reduced to accelerate the current response. Accordingly, if the current amplitude $\Delta i$ is set such that the switching frequency in the last one period does not exceed the maximum switching frequency of the switching devices SW1, SW2, the actual switching frequency of the switching devices SW1, SW2 never exceeds the maximum switching frequency over the entire period of the repeating period.

In this case, the current amplitude is calculated by substituting the minimum inductance $L_o$ into the instantaneous inductance $L_m$. The grounds for this calculation is that, since the actual inductance of the winding never becomes smaller than the minimum inductance $L_o$, the calculation using the minimum inductance $L_o$ ensures that the actual switching frequency of the switching devices SW1, SW2 never exceed the maximum switching frequency over the entire period of the repeating period.

The repeating period of the regenerative mode and the reflux mode terminates at the predetermined rotation angle $\theta$off of the rotor. The angle $\theta$off, however, may be set to be an angle corresponding to a point of time during the falling period of inductance L of the winding, in other words, an angle before the inductance L reaches the minimum inductance $L_o$. In this case, the current amplitude $\Delta i$ obtained by using the minimum inductance $L_o$ can not sufficiently bring out the switching ability of the switching devices SW1, SW2.

In this case, if the inductance $L_2$ corresponding to $\theta$off is substituted into the inductance $L_m$ in Eq.(13) to calculate the current amplitude, the actual switching frequency in the last one period of current change in the repeating period becomes closer to the maximum switching frequency of the switching devices SW1, SW2, and thus power generation amount becomes larger, compared with the case in which the minimum inductance $L_o$ is used. It is noted that, in the case where the inductance $L_2$ corresponding to $\theta$off is used in the control as described above, it is necessary to store in advance the relation between $\theta$off in the range of use and the inductance into a memory device in a controller such as a microcomputer and calculate the current amplitude $\Delta i$ according to Eq.(13) every time, because $\theta$off varies in a certain range depending upon various conditions.

Figure 9:
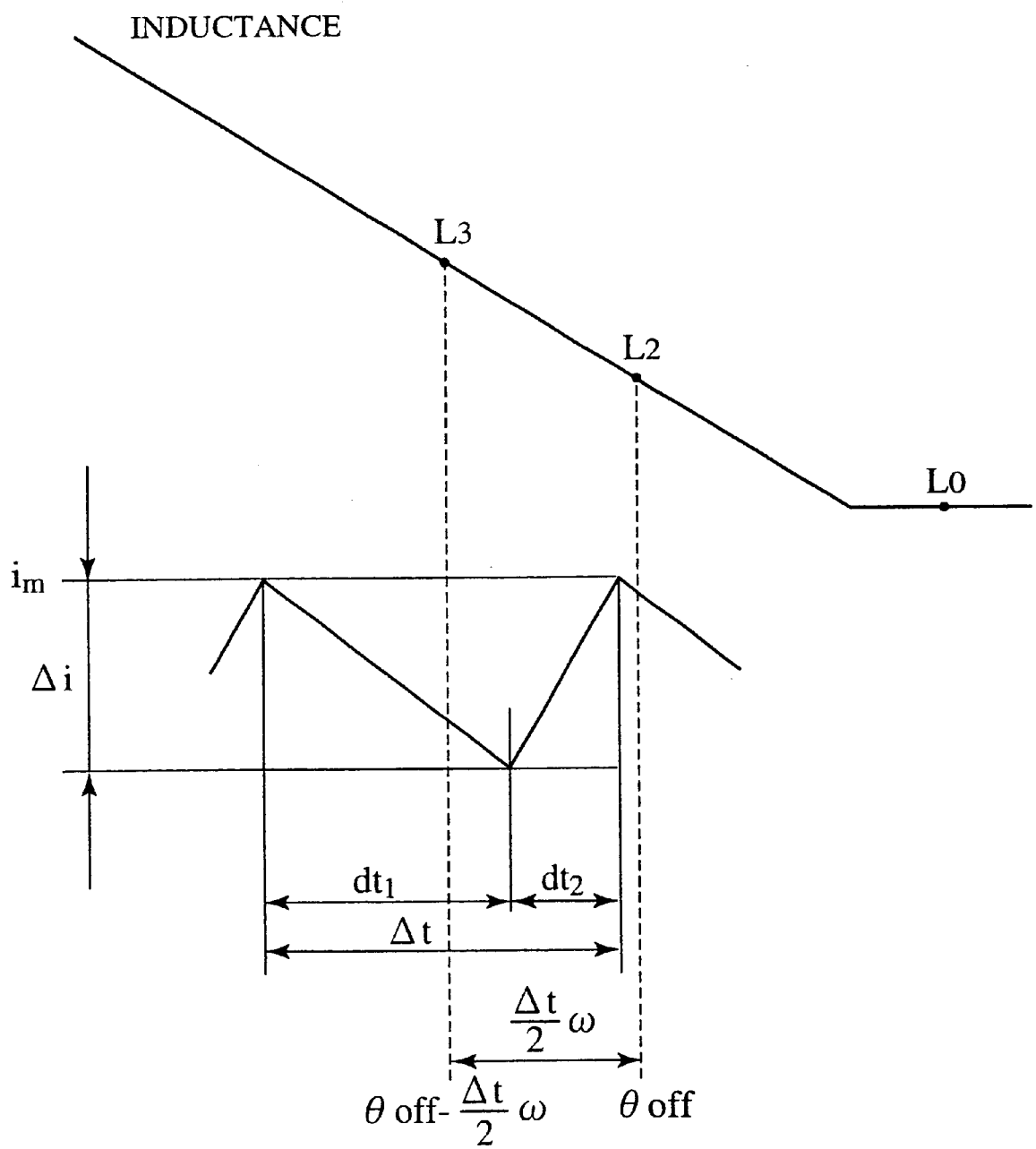
FIG. 9 is a view showing an inductance used to calculate a current amplitude in the SR motor driving circuit according to the second embodiment of the present invention.

Further, even in the case where the inductance $L_2$ corresponding to $\theta$off is used to obtain the current amplitude $\Delta i$, the period $\Delta t(dt_1 + dt_2)$ calculated according to Eq.(13) is slightly larger than the minimum switching period $\Delta t_o$, since. the inductance $L_2$ corresponding to $\theta$off is an inductance after the last one period in the repeating period terminates. Therefore, if the current amplitude $\Delta i$ should be reduced much more, such current amplitude $\Delta i$ can be calculated by substituting an inductance (inductance prior to $\theta$off by the half period) $L_3$, which is obtained when the rotation angle of the rotor is $\theta$off$-(\Delta t/2) \cdot \omega$, into the inductance $L_m$ in Eq.(13). As shown in FIG. 9, this inductance $L_3$ is an inductance at an almost intermediate point of time in the last one period of the repeating period, and can be assumed as an average inductance in the last one period. Therefore, it can be estimated that the period $\Delta t$ at this time becomes very close to the minimum switching period $\Delta t0$, so that the power generation amount can be increased up to the maximum.

Third Embodiment

A third embodiment of the present invention will be explained with reference to the drawings hereunder. In the above second embodiment, the upper limit value $i_m$ of the current and the current amplitude $\Delta i$ to control the repeating operation of the regenerative mode and the reflux mode are set constant in the overall repeating period of the regenerative mode and the reflux mode. In contrast, in the third embodiment, the current amplitude $\Delta i$ is changed positively with the lapse of time (rotation angle of the rotor). Since an overall configuration of the SR motor and a configuration of the driving circuit are similar to those in the above first embodiment, their explanation will be omitted.

In the above second embodiment, the current amplitude $\Delta i$ is set such that the switching period $\Delta t$ of the current change in the last one period during the repeating period does not exceed the minimum switching period $\Delta t_0$ of the switching devices SW1, SW2. If the switching period is controlled to make the current amplitude $\Delta i$ constant, the actual switching period in the former half (see the B portion in FIG. 7C) of the repeating period becomes longer than the minimum switching period and thus the switching capability of the switching devices SW1, SW2 is not fully utilized. Therefore, the current amplitude $\Delta i$ in this period is set smaller than the current amplitude $\Delta i$ in the last one period, it is possible to increase the power generation amount much more.

Figure 10:
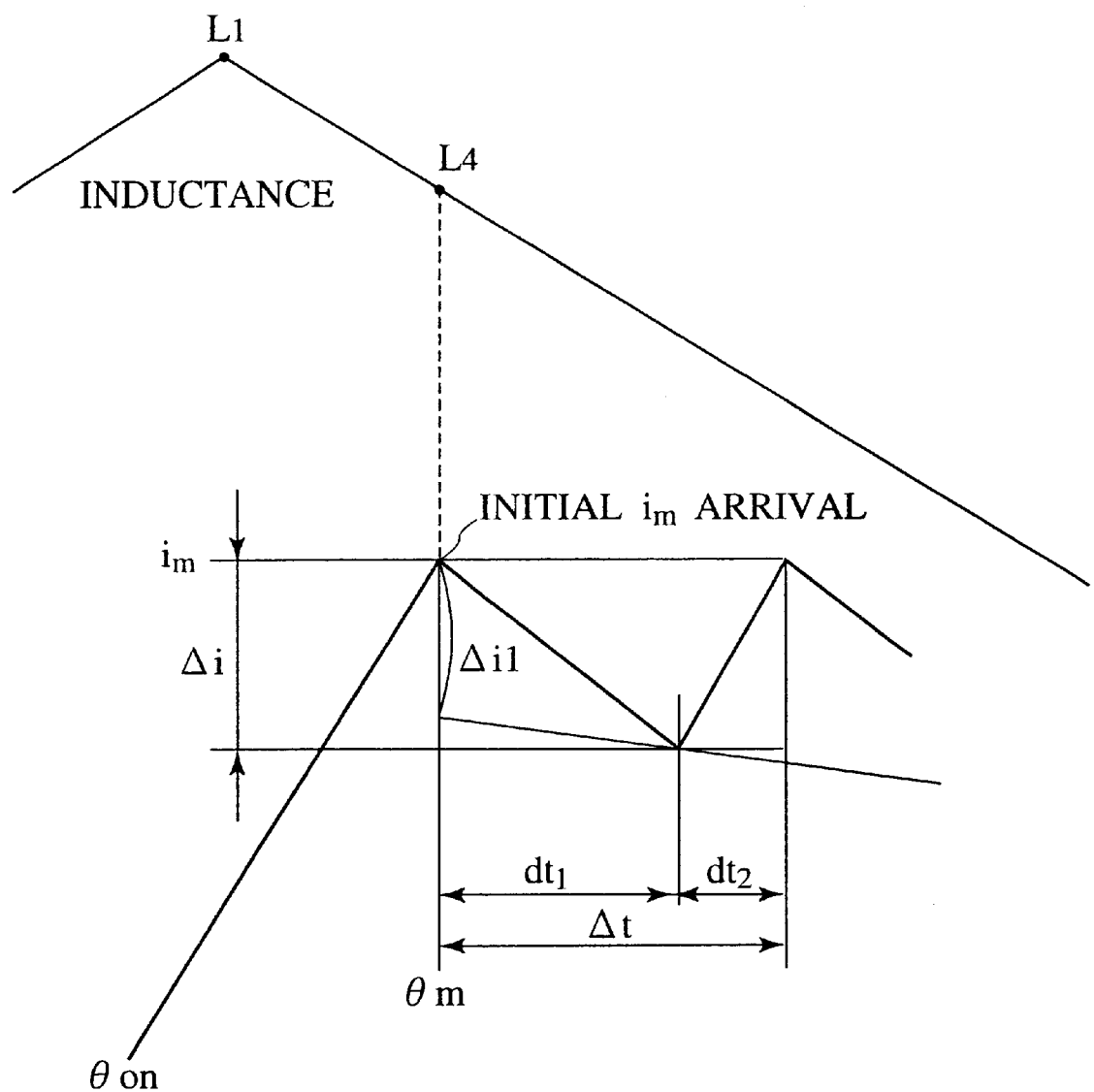
FIG. 10 is a view showing an inductance used to calculate a current amplitude in an SR motor driving circuit according to a third embodiment of the present invention.

This event will be explained with reference to FIG. 10 hereunder. First, if the supply mode is started by turning ON the switching devices SW1, SW2 simultaneously when the rotor is positioned at the rotation angle $\theta$on in the rising latter half period of the inductance, the current is increased to reach the predetermined upper limit value $i_m$ of the current. Then, the rotation angle $\theta$m of the rotor is detected at that time. Assume that an inductance (initial $i_m$ arrival inductance) $L_4$ at a point of time of the angle $\theta$m is stored and held previously in a memory device of a controller. Then, the current amplitude $\Delta i$ at this time (this value is referred to as $\Delta i_1$) is calculated by substituting the initial $i_m$ arrival inductance $L_4$ into the inductance $L_m$ in Eq.(13) in the second embodiment. The current amplitude $\Delta i$ at the time of $\theta$off (this value is referred to as $\Delta i_2$) has already been calculated by substituting the $\theta$off-time inductance L2 into Eq.(13).

Figure 11A:
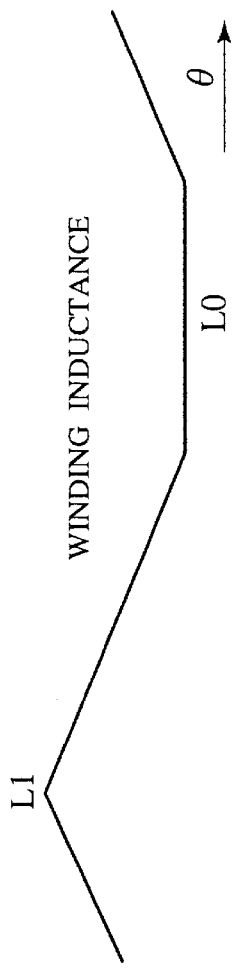
Figure 11B:
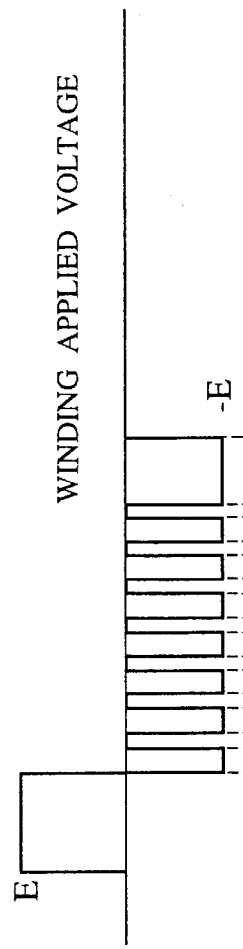
Figure 11C:
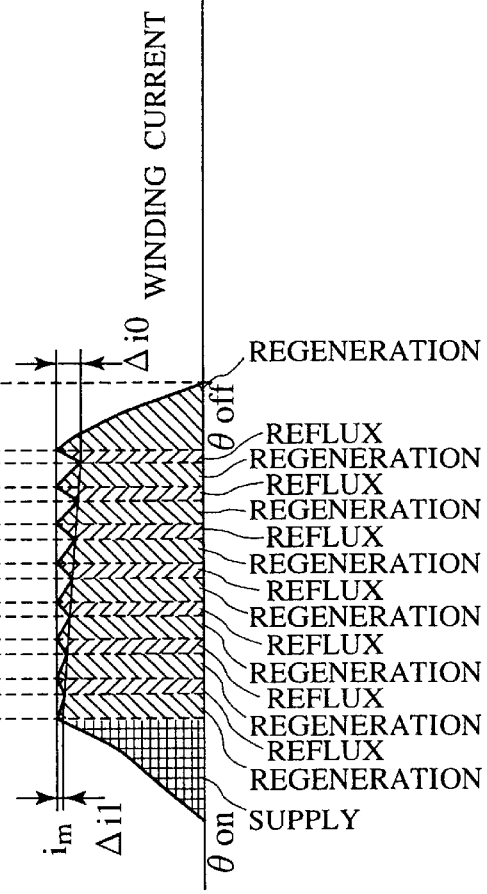

Then, the rotation angle $\theta$ of the rotor is changed from $\theta$m to $\theta$off whereas the current amplitude $\Delta i$ is changed linearly from $\Delta i_1$ to $\Delta i_2$. Accordingly, as shown in FIGS. 11A to 11C, not only the actual switching period $\Delta t$ becomes substantially constant in the overall repeating period of the regenerative mode and the reflux mode, but also such actual switching period $\Delta t$ can substantially coincide to the minimum switching period $\Delta t_0$, and thus it is possible to maximize the power generation amount without destroying the switching devices SW1, SW2. Further, the dispersion of the power generation amount and the current ripple can be curbed. Therefore, the road on the power supply and the auxiliary parts thereof (capacitor connected in parallel to the power supply) is reduced. Here, FIGS. 11A to 11C are views showing execution timings of respective modes according to the second embodiment of the present invention, wherein FIG. 11A shows a relationship between the rotation angle of the rotor (abscissa) and the inductance L (ordinate), FIG. 11B shows a relationship between the rotation angle of the rotor (abscissa) and the winding applied voltage (ordinate), and FIG. 11C shows a relationship between the rotation angle of the rotor (abscissa) and a winding current (ordinate).

Figure 18:
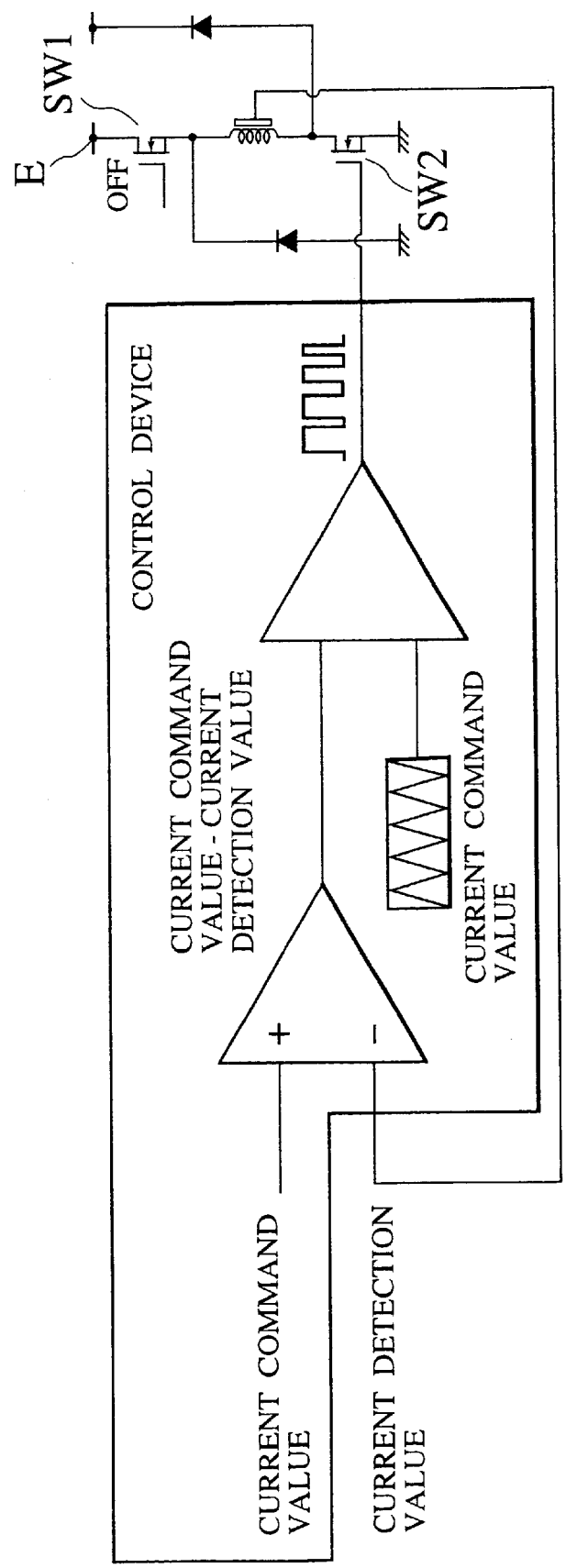
FIG. 18 is a circuit diagram applied to the case where PWM current control is carried out in the second embodiment of the present invention.

Also, in order to render the switching period $\Delta t$ constant, there is a method employing PWM current control. According to the PWM current control, a difference between a current command value $i_m$ and a current detection value is calculated, and then an ON duty and an OFF duty are generated by comparing this difference value with a chopping wave having a predetermined period. This PWM current control is illustrated in a circuit diagram shown in FIG. 18. According to a configuration in FIG. 18, if a compared value (comparator output) between the difference value and the chopping wave having the predetermined period is positive, the switching device SW2 is turned ON to execute the reflux mode whereas, if the comparator output is negative, the switching device SW2 is turned OFF to execute the regenerative mode. In this manner, according to the PWM current control, the regenerative mode and the reflux mode are repeated at the predetermined period. It is desired that this repeating period should be set as small as possible to reduce the current amplitude, and thus such repeating period can be decided in response to the minimum switching period of the switching devices SW1, SW2. FIG. 19C shows the current waveform when the above PWM current control is applied, and gives the repetitive waveform of the regenerative mode and the reflux mode which has a constant frequency. In this case, a sawtooth waveform may be used in place of the chopping waveform. As described above, as a general-purpose PWM control circuit parts can be applied, a control circuit of an SR motor can be easily realized by using general-purpose parts, and also the production cost can be reduced.

As described above, if the PWM current control is applied, it is easy to make the switching period $\Delta t$ constant. In addition, it is easy to change the rate of the period of the regenerative mode to the period of the reflux mode in each switching period by changing the duty ratio, such as 6 to 4, 7 to 3, etc., while keeping switching period $\Delta t$ constant.

Fourth Embodiment

A fourth embodiment of the present invention will be explained with reference to the drawings hereunder. In the above second and third embodiments, after the supply mode has been executed, the regenerative mode and the reflux mode are executed repeatedly. In contrast, in this fourth embodiment, after the supply mode (first supply mode) has been executed, the regenerative mode and the supply mode (second supply mode) are executed repeatedly.

Figures 12A, 12B, 12C:
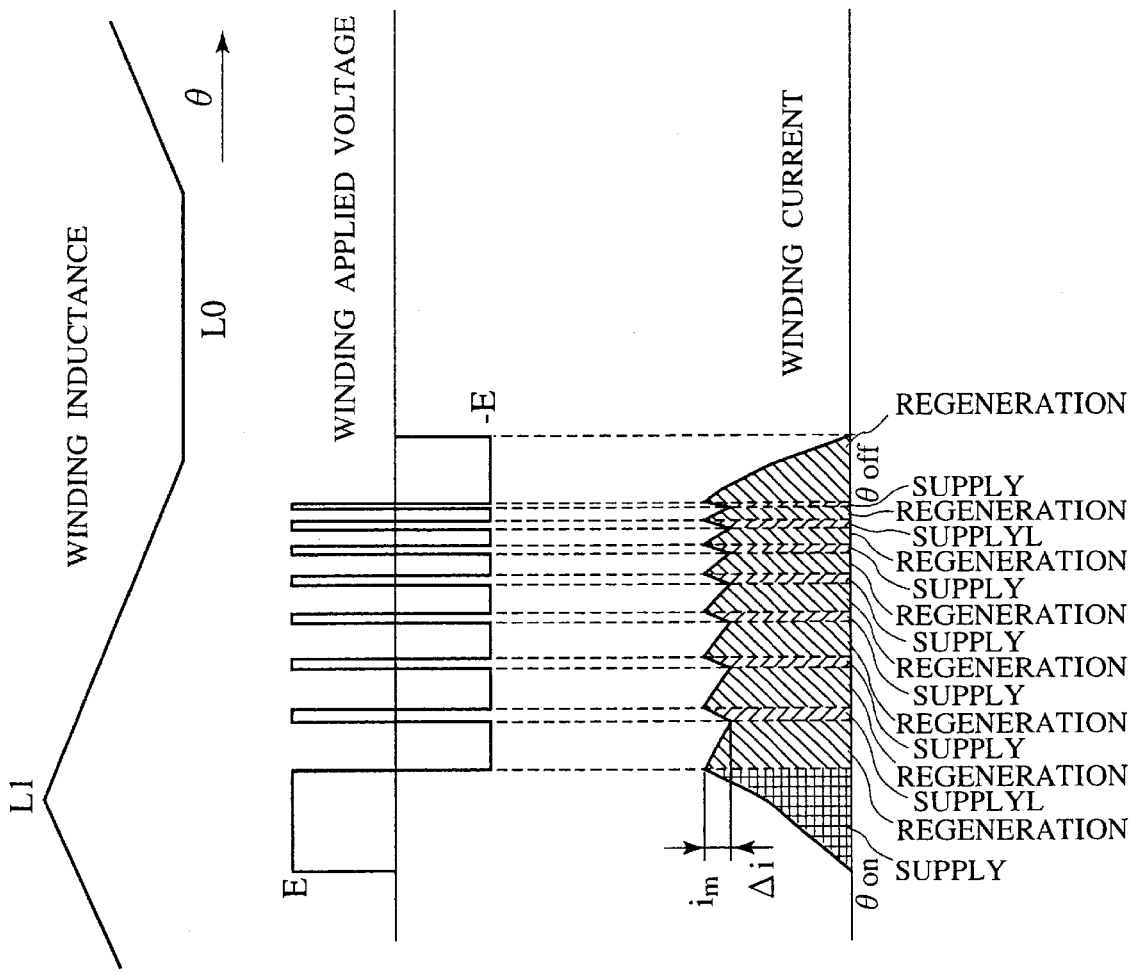

FIGS. 12A to 12C are views showing execution timings of respective modes according to the fourth embodiment of the present invention, wherein FIG. 12A shows a relationship between the rotation angle of the rotor (abscissa) and the inductance L (ordinate), FIG. 12B shows a relationship between the rotation angle of the rotor (abscissa) and the winding applied voltage (ordinate), and FIG. 12C shows a relationship between the rotation angle of the rotor (abscissa) and the winding current (ordinate).

As shown in FIGS. 12A to 12C, in the fourth embodiment, the supply mode (first supply mode) is started by turning ON the switching devices SW1, SW2 at the same time when the rotor is positioned at the predetermined rotation angle $\theta$on in the rising latter half period of the inductance L. Accordingly, the current flowing through the winding is increased. Then, when the winding current (detected current) reaches the predetermined upper limit value $i_m$ at a point of time when the inductance L is turned to fall or in the succeeding falling period, the regenerative mode is executed by turning OFF the switching devices SW1, SW2 simultaneously. Accordingly, the winding current is reduced. Then, when the current is reduced from the upper limit value by the predetermined current amplitude Δi to thus reach the predetermined lower limit value, the supply mode (second supply mode) is executed by turning ON the switching devices SW1, SW2 at the same time. Accordingly, the winding current is increased once again.

Similarly, when the detected current reaches the predetermined upper limit value and the predetermined lower limit value respectively, the regenerative mode and the supply mode are alternatively executed repetitively. Then, when the rotor is positioned at the predetermined rotation angle θoff (at a point of time prior to a point of time when the inductance L is turned from the falling to the plateau), the repeating control of the regenerative mode and the supply mode is completed. Then, the regenerative mode is executed until the current is reduced to zero.

Like the above second embodiment, in the control method of repeating the regenerative mode and the supply mode, since the increase in the current in the reflux mode is gentle when the SR motor is used in the low rotational range, the execution time of the regenerative mode is shortened corresponding the gentle increase to thus reduce the power generation amount. In contrast, since the increase in the current in the supply mode is large rather than that in the reflux mode and thus the current reaches quickly the upper limit value, the execution time of the regenerative mode can be extended correspondingly to thus increase the power generation amount. Also, in the very low rotational range in which the number of rotations of the rotor is further low, the current is not increased by carrying out the reflux mode, as described above. However, in the fourth embodiment, since the supply mode is executed in place of the reflux mode, the SR motor can be employed in the very low rotational range not to cause the problem.

In the fourth embodiment, like the above second embodiment, the upper limit value and the current amplitude Δi that are the current values to control the mode switching timing are employed in the repeating period in which the regenerative mode and the supply mode are repeated. Thus, it is true that, as discussed in the above second embodiment, the smaller current amplitude Δi is advantageous to the SR motor. Therefore, since its control is almost similar, explanation will be omitted.

However, since the supply mode is executed instead of the reflux mode, the following Eq.(15) derived by modifying above Eq.(10) in connection with the current amplitude Δi must be applied. In other words, substituting V=E in the supply mode into Eq.(8) yields $$di_2/dt_2 = \{E-[R+\omega'(dL/d\theta)]i_m\}/L_m \quad (15)$$

Accordingly, $$\Delta t = \Delta i \cdot 2EL_m/(E^2-\alpha^2) \quad (16)$$

is obtained based on Eqs.(9),(11),(12),(15), where α=−(R+ω(dL/dθ))$i_m$.

The current amplitude Δi which can satisfy above Eq.(14) with respect to the minimum switching period (reciprocal of the maximum switching frequency) $\Delta t_0$ of the switching devices SW1, SW2 is calculated, and then the upper limit value and the lower limit value of the current to control the repeating operation are set based on this current amplitude Δi.

It is similar to the above second embodiment that the current amplitude Δi to control the repetition of the regenerative mode and the supply mode can be set almost constant in the overall repeating period of the regenerative mode and the supply mode. Also, the decision method of the inductance (instantaneous inductance) $L_m$ in Eq.(16) is similar to the above second embodiment. In addition, it is similar to the above third embodiment that the current amplitude Δi can be positively changed with the lapse of time (rotation angle of the rotor) in the repeating period of the regenerative mode and the supply mode.

Fifth Embodiment

A fifth embodiment of the present invention will be explained with reference to the drawings hereunder. In the above second embodiment, after the supply mode has been executed, the regenerative mode and the reflux mode are executed repeatedly. In the above fourth embodiment, after the supply mode (first supply mode) has been executed, the regenerative mode and the supply mode (second supply mode) are executed repeatedly. In contrast, in this fifth embodiment, above operations are employed in a mixed manner.

Figure 13A:
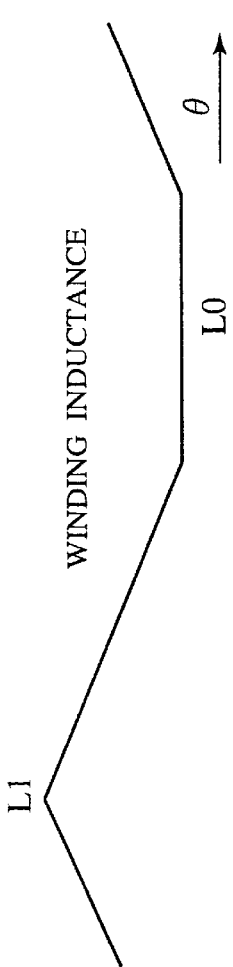
Figure 13B:
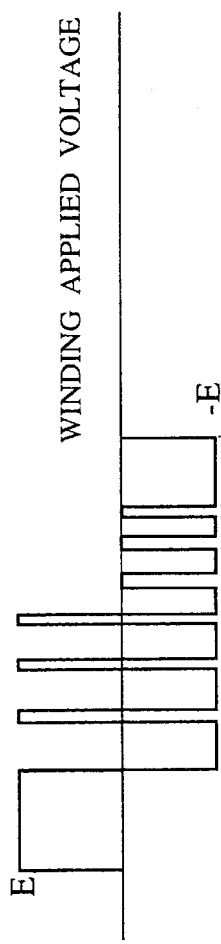
Figure 13C:
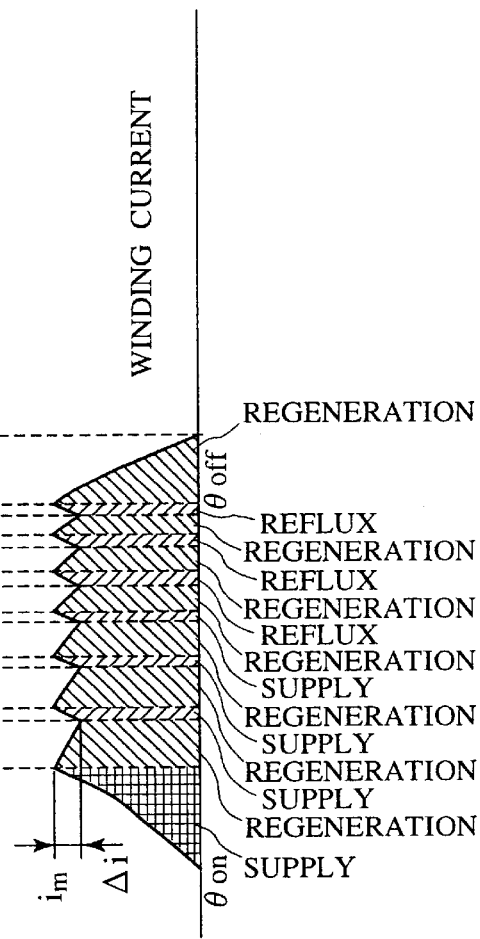

FIGS. 13A to 13C are views showing execution timings in respective modes according to a fifth embodiment of the present invention, wherein FIG. 13A shows a relationship between the rotation angle of the rotor (abscissa) and the inductance L (ordinate), FIG. 13B shows a relationship between the rotation angle of the rotor (abscissa) and the winding voltage (ordinate), and FIG. 13C shows a relationship between the rotation angle of the rotor (abscissa) and the winding current (ordinate).

As shown in FIGS. 13A to 13C, in the fifth embodiment, the supply mode (first supply mode) is started by turning ON the switching devices SW1, SW2 simultaneously when the rotor is positioned at the predetermined rotation angle θon in the rising latter half period of the inductance L. Accordingly, the current flowing through the winding is increased. Then, when the winding current (detected current) reaches the predetermined upper limit value $i_m$ at a point of time when the inductance L is turned to fall or in the succeeding falling period, the regenerative mode is executed by turning OFF the switching devices SW1, SW2 at the same time. Accordingly, the winding current is reduced. Then, when the current is reduced from the upper limit value by the predetermined current amplitude Δi to thus reach the predetermined lower limit value, the supply mode (second supply mode) is executed by turning ON the switching devices SW1, SW2 at the same time. Accordingly, the winding current is increased once again.

Similarly, when the detected current reaches the predetermined upper limit value and the predetermined lower limit value respectively, the regenerative mode and the supply mode are alternatively executed repetitively (first repeating mode). Then, when the rotation angle of the rotor reaches the predetermined rotation angle or at a point of time when the predetermined number of periods is passed, the regenerative mode and the reflux mode are executed repetitively (second repeating mode). That is, when the current is reduced from the upper limit value by the predetermined current amplitude Δi to thus reach the predetermined lower limit value after the regenerative mode has been executed, the reflux mode is executed by turning OFF the switching device SW1 and turning ON the switching device SW2, and thus the regenerative mode and the reflux mode are repeated.

Then, when the rotor is positioned at the predetermined rotation angle θoff (at a point of time prior to a point of time when the inductance L is turned from the falling to the plateau), the repeating control of the regenerative mode and the supply mode is completed. Then, the regenerative mode is executed until the current is reduced to zero.

Like the above second embodiment, when the regenerative mode and the reflux mode are executed repetitively in the inductance falling period, the execution time of the regenerative mode is shortened to thus undesirably reduce the regenerative amount of energy since increase in the current due to execution of the reflux mode is gentle in the relatively early period (i.e., period during when the inductance is relatively large) of the repeating period. For this reason, in the fifth embodiment, since the current can be increased quickly by executing the supply mode in place of the reflux mode at that time, the execution time of the regenerative mode can be increased correspondingly to thus increase the generation amount of energy. In contrast, since the increase in the current in the supply mode because of the execution of the reflux mode in the relatively late period (i.e., period during when the inductance is relatively small) of the repeating period is quick rather than the period during when the inductance is relatively large, the current can be increased without power consumption by executing not the supply mode but the reflux mode in this period, and thus the power generation amount can be increased as a whole.

In the fifth embodiment, like the above second embodiment, the upper limit value and the current amplitude $\Delta i$ that are the current values to control the mode switching timing are employed in the repeating period in which the regenerative mode and the supply mode are repeated. Thus, it is the same as the above second embodiment that the smaller current amplitude $\Delta i$ is advantageous to the SR motor. Therefore, since its control is almost similar, explanation will be omitted. As with above respective equations in connection with the current amplitude $\Delta i$ at this time, the equations discussed in the above fourth embodiment are employed in the first repeating mode in which the regenerative mode and the supply mode are repeated, while the equations discussed in the above second embodiment are employed in the second repeating mode in which the regenerative mode and the reflux mode are repeated.

It is similar to the above second embodiment that the current amplitude $\Delta i$ for the repetition control can be set almost constant in the overall repeating period of the regenerative mode and the supply mode. Also, it is similar to the above third embodiment that the current amplitude $\Delta i$ can be positively changed with the lapse of time (rotation angle of the rotor) in the repeating period of the regenerative mode and the supply mode.

Sixth Embodiment

A sixth embodiment of the present invention will be explained with reference to the drawings hereunder. This sixth embodiment intends to optimize a start timing of the supply mode or the first supply mode, which is finished at the same time when the repetition mode is started (referred also to as the initial supply mode hereinafter) and a start timing of the regenerative mode, which is started at the same time when the repetition mode is finished (referred also to as the last regenerative mode hereinafter) in the above second to fifth embodiments, from the viewpoint of increasing the power generation amount.

Figures 14A, 14B:
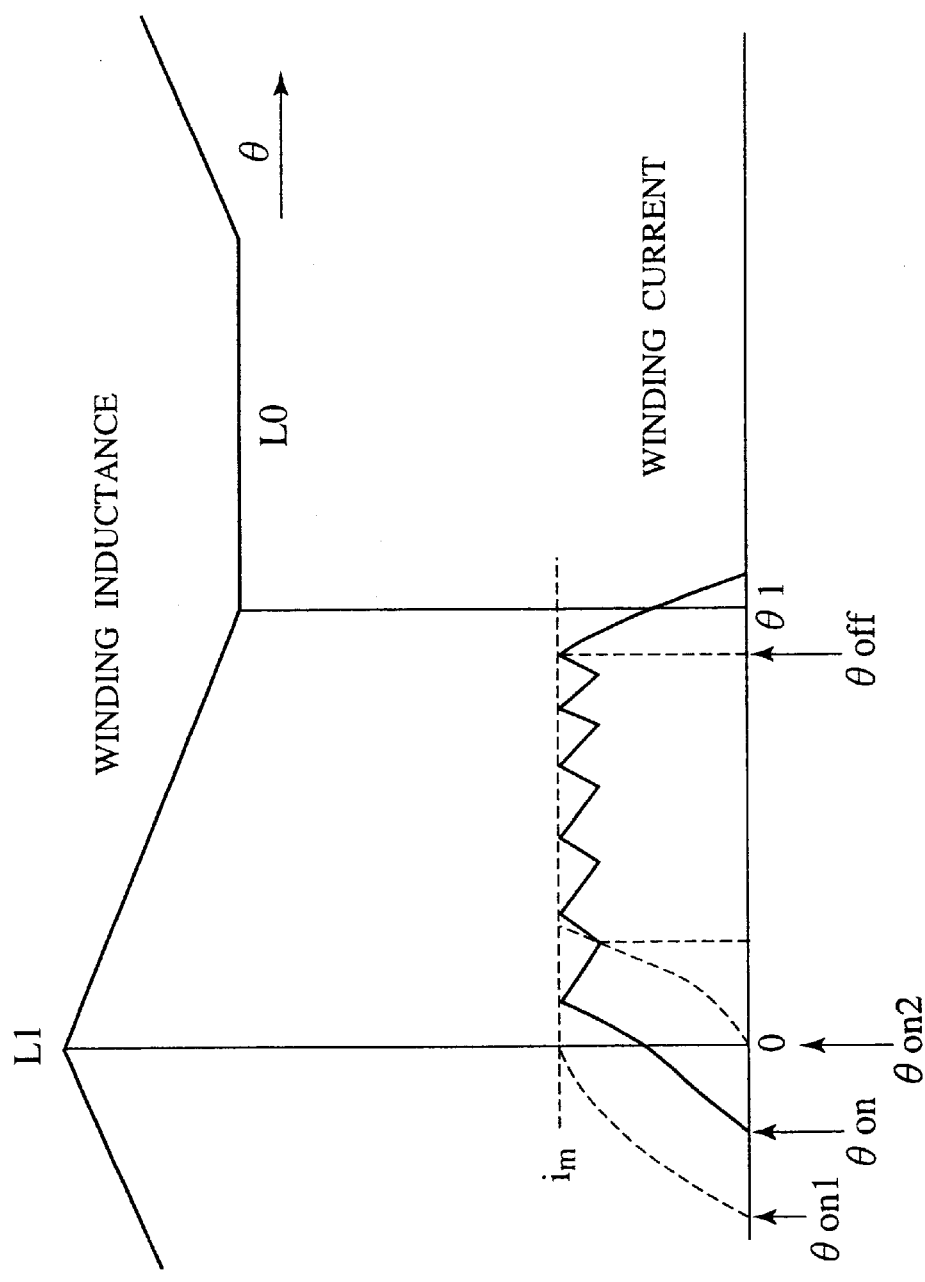
Figure 15:
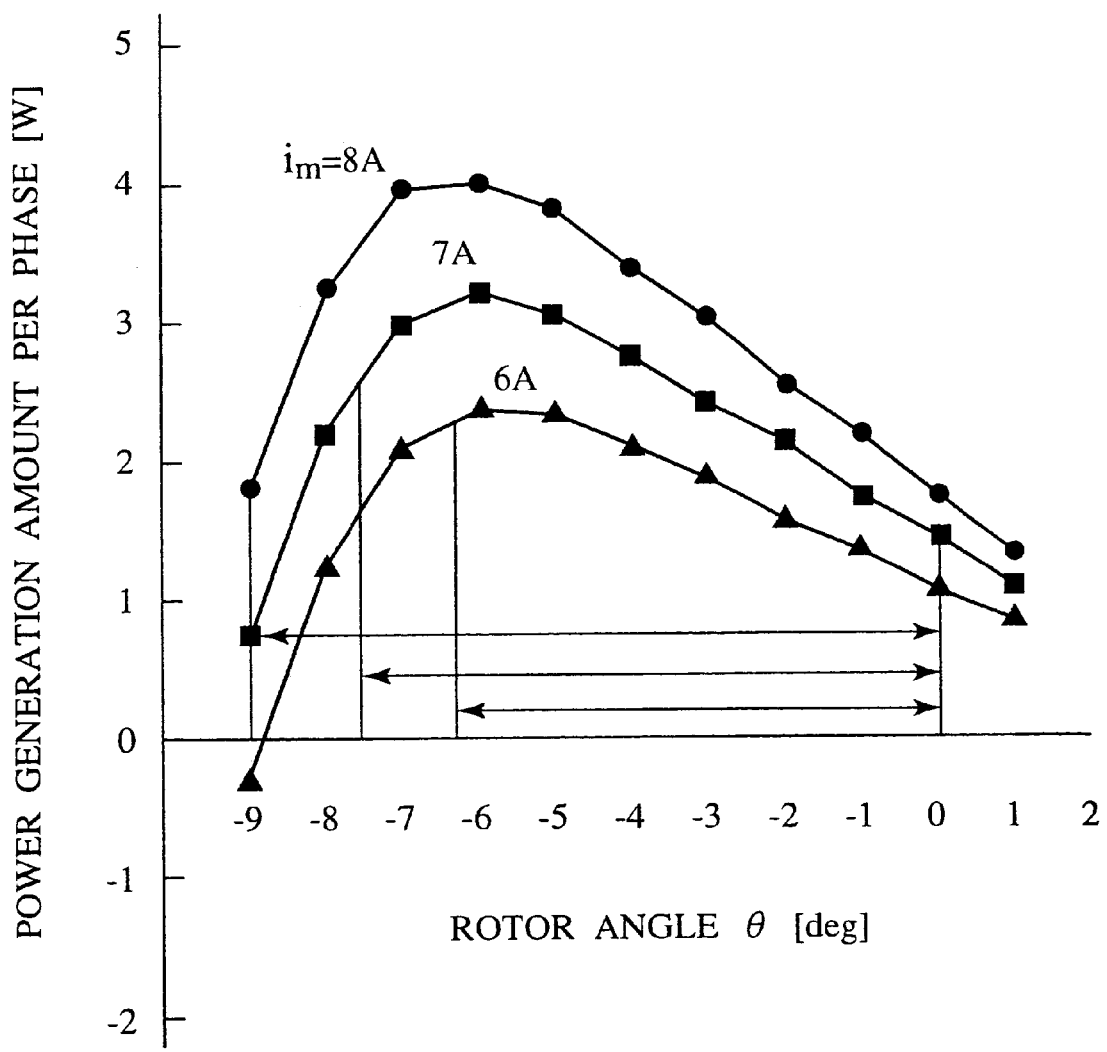
FIG. 15 is a graph showing a relationship between start timings in the supply mode and an amount of power generation if a first current value is set variously in the sixth embodiment of the present invention.
Figures 16A, 16B:
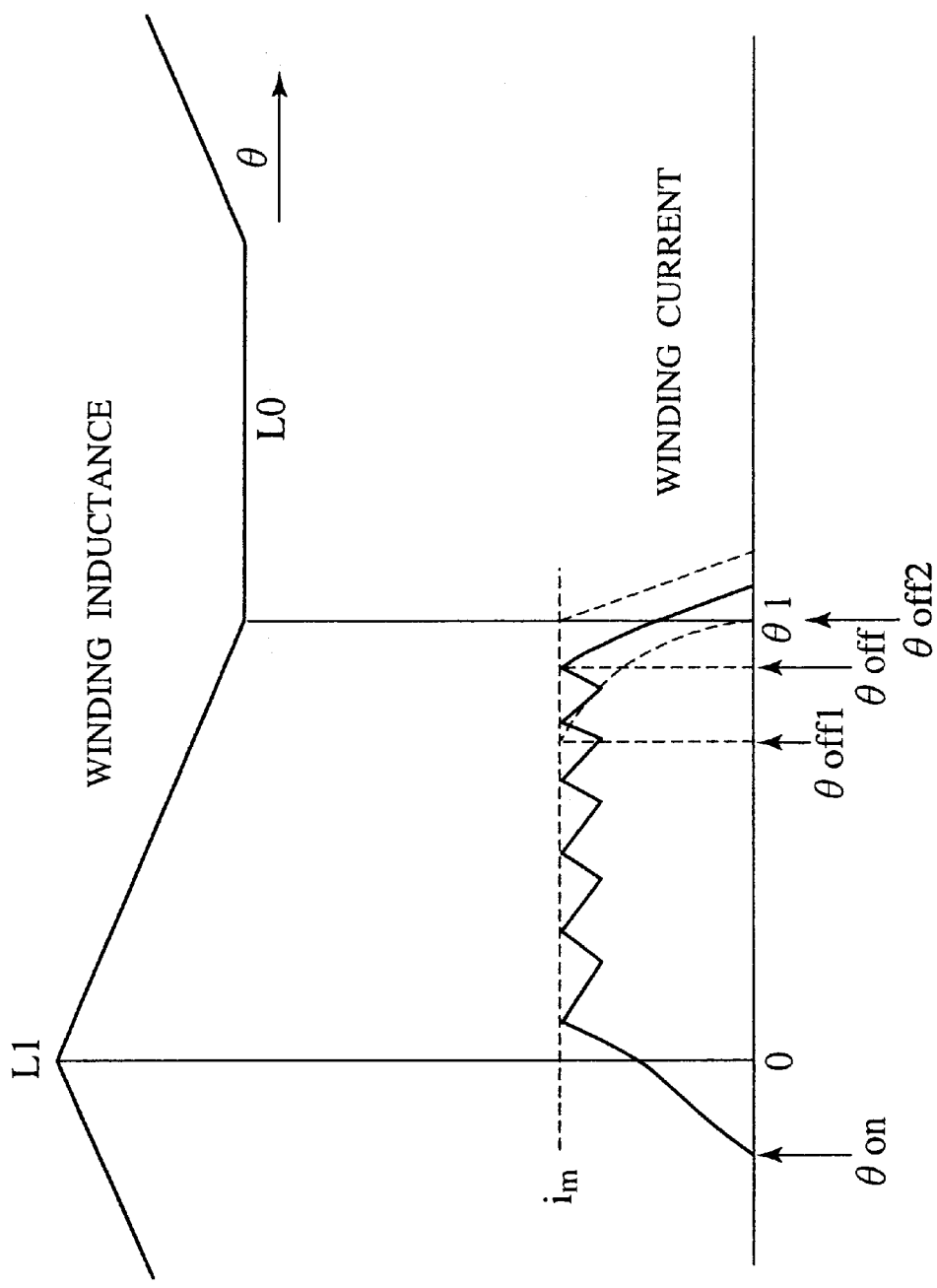

FIGS. 14A and 14B are views showing start timings of the initial supply mode according to the sixth embodiment of the present invention, wherein FIG. 14A shows a relationship between the rotation angle of the rotor (abscissa) and the inductance L (ordinate), and FIG. 14B shows a relationship between the rotation angle of the rotor (abscissa) and the winding current (ordinate). FIG. 15 is a graph showing a relationship between start timings in the supply mode and the power generation amount if the first current value is set variously in the sixth embodiment of the present invention. FIGS. 16A and 16B are views showing start timings of the last regenerative mode in the sixth embodiment of the present invention, wherein FIG. 16A shows a relationship between the rotation angle of the rotor (abscissa) and the inductance L (ordinate), and FIG. 16B shows a relationship between the rotation angle of the rotor (abscissa) and the winding current (ordinate).

First, FIGS. 14A and 14B are referred to hereunder. The initial supply mode is started when the rotor reaches the certain angle $\theta$on, and the current flowing through the winding is increased. Then, the initial supply mode is ended and at the same time the repetition mode is started when the current reaches the predetermined upper limit value $i_m$. In the repetition mode, the regenerative mode and the reflux or the supply mode (second supply mode) are repeated. Then, the repetition mode is terminated and at the same time the last regenerative mode is started when the rotor reaches the certain angle $\theta$off. Thus, the current flowing through the winding is reduced finally to zero and then one period of this control method is finished. Here, the power generation amount can be derived as a difference between the total regenerative power in the regenerative mode and the supply power in the supply mode.

For this reason, if the predetermined upper limit value $i_m$ of the current is decided, a start timing $\theta$on of the initial supply mode serves as an important factor to affect the power generation amount. If this start timing $\theta$on of the initial supply mode is set between $0<\theta on<\theta_1$, it is possible to accelerate the rising of the current and also reduce the supply power because such timing is positioned in the inductance reducing period. Where the rotation angle of the rotor is set to 0 (zero) at a point of time when a period in which the winding inductance is lowered as the rotor rotates is started, i.e., when the winding inductance reaches the maximum inductance $L_1$, and the rotation angle of the rotor is set to $\theta_1$ at a point of time when the period in which the winding inductance is lowered as the rotor rotates is ended, i.e., when the winding inductance reaches the minimum inductance $L_0$.

However, since the regenerative/reflux (or supply) repeating period is shortened by the initial supply mode if $\theta$on is set in the above range, the regenerative power is reduced and as a result the power generation amount is reduced. Therefore, if the start angle $\theta$on is leaded toward the direction of $\theta on<0$, the regenerative/reflux repeating period is extended and thus the regenerative power can be increased. In this case, if the start angle $\theta$on is too leaded, the rising of the current becomes slow to thus increase the supply power since the start angle is located in the inductance increasing period. As a result, the power generation amount is also reduced. It can be understood based on the above that a balance of the supply power and the regenerative power is changed according to the start angle $\theta$on and thus an optimum value of $\theta$on is present to maximize the power generation amount.

As shown in FIG. 14B, the optimum value range is given as $\theta on_1 \leq \theta on \leq \theta on_2$. An angle $\theta on_2$ is an angle at which the winding inductance is started to reduce as the rotor rotates, and coincides with 0 in FIG. 14B. An angle $\theta on_1$ is an angle which provides an ON timing after which the current reaches the predetermined upper limit value $i_m$ at $\theta on=\theta on_2$ (=0).

FIG. 11 shows simulation results of the power generation amount when the ON timing $\theta$on is changed, and shows the cases where the current upper limit value is set to 6, 7, 8 A respectively. In FIG. 11, the abscissa denotes the rotation angle $\theta$ (degree) of the rotor, and the ordinate denotes the power generation amount (W) per phase. The rotation angle $\theta=0$ of the rotor provides a state in which the salient pole of the stator and the salient pole of the rotor face perfectly each other, i.e., a middle point of the top end of the salient pole of the stator along the rotor rotation direction and a middle point of the top end of the salient pole of the rotor along the rotor rotation direction are positioned opposite to each other. In FIG. 15, an angle range from θ=0 as a reference to another angle (leftside position) indicated by the bidirectional arrow gives the ON timing which satisfies the winding current can reach the upper limit value $i_m$ at θ=0. As evident from FIG. 15, it can be checked that θon to maximize the power generation amount for each current upper limit value is located in the range in FIG. 15 indicated by the bidirectional arrow. It can be understood that the highly effective power generation can be achieved by starting the initial supply mode (by turning ON the switching devices SW1, SW2 simultaneously) within this range (from $θon_1$ to $θon_2$).

Then, like the above start timing (θon) of the initial supply mode, a start timing θoff of the last regenerative mode is an important factor to affect the power generation amount. If θoff is lagged rather than $θ_1$, the regenerative power can be increased. However, since the start timing θoff is located in the constant inductance period, the falling of the current is accelerated and also the regenerative power in the last regenerative mode is reduced. As a result, the power generation amount is reduced.

In contrast, if θoff is leaded rather than $θ_1$, the rising of the current becomes slow and the regenerative power in the last regenerative mode can be increased since the start timing θoff is located in the inductance reducing period. If θoff is too leaded, the regenerative/reflux (or supply) repeating period is shortened and as a result the power generation amount is also reduced. It can be understood based on the above that the optimum value of θoff is present to maximize the power generation amount.

As shown in FIG. 16B, the optimum value range is given as $θoff_1 ≦ θoff ≦ θoff_2$. An angle $θoff_2$ is an angle at which the winding inductance starts to be the minimum constant value as the rotor rotates, and coincides with $θ_1$ in FIG. 16B. An angle $θoff_1$ is an angle which provides an OFF timing after which the current reaches 0 at the rotation angle of the rotor $θ=θoff_2(=θ_1)$. It can be understood that the highly effective power generation can be achieved by starting the last regenerative mode (by turning OFF the switching devices SW1, SW2 simultaneously) within the range from $θoff_1$ to $θoff_2$.

As described above, the power generation amount can be maximized by controlling the start timing (angle) θon of the initial supply mode and the start timing (angle) θoff of the last regenerative mode into the optimum value range respectively.

Since the inductance waveform in the actual motor is not formed as the chopping waveform having shape edges shown until now (formed as a waveform having rounded edges), the angle $θon_2$ at which reduction of the inductance starts and the angle $θoff_2$ at which the inductance comes close to the minimum value cannot be defined precisely. In this case, ideally the inductance waveform can be derived from the motor shape and these angles can be given by following equations.

$θon_2$={(circular arc angle $θ_R$ of the salient pole of the rotor)−(circular arc angle $θ_S$ of the salient pole of the stator)}/2

$θoff_2$={(circular arc angle $θ_R$ of the salient pole of the rotor)+(circular arc angle $θ_S$ of the salient pole of the stator)}/2

Figure 17:
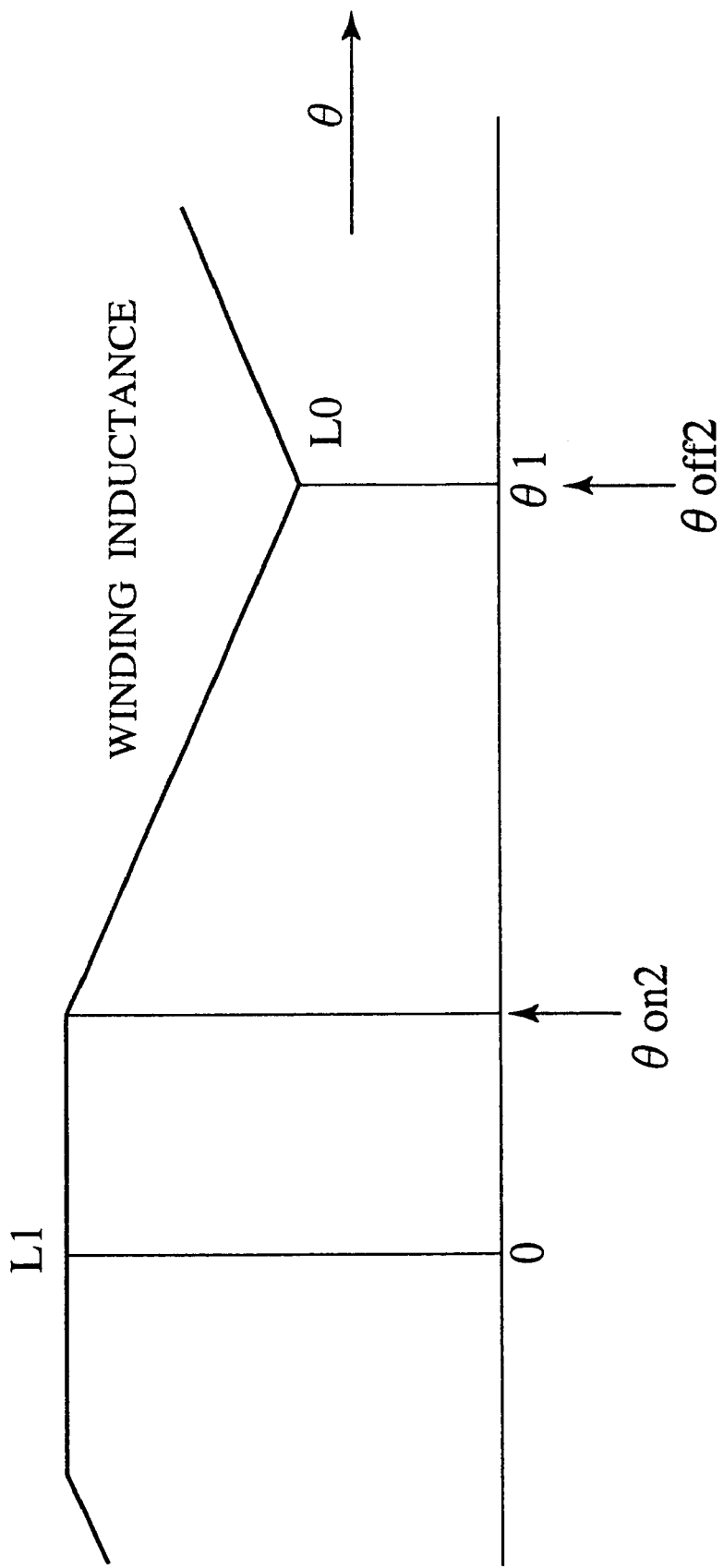
FIG. 17 is a view showing a waveform of the SR motor having a different inductance waveform in the sixth embodiment of the present invention.

Also, in the motor in which the inductance waveform becomes the trapezoidal waveform, as shown in FIG. 17, for example, these angles can be defined according to these equations.

In this manner, the angle $θon_2$ at which the period during when the inductance of the rotor is reduced as the rotor rotates is started and the angle $θoff_2$ at which the period during when the inductance of the rotor is reduced as the rotor rotates is ended can be obtained by calculation.

Next, there will be explained hereunder a method of detecting the start angle $θon_1$ of the supply mode which satisfies that the winding current reaches the upper limit value $i_m$ at the angle θ=0 of the rotor and the start angle $θoff_1$ of the last regenerative mode which satisfies that the winding current reaches zero at the angle $θ=θ_1$ of the rotor, by calculation based on the power supply voltage, motor constants, the rotation speed, and the predetermined upper limit value $i_m$ of the current.

First, the start angle $θon_1$ is obtained. If the initial supply mode is started in the period in which the winding inductance is increased as the rotor rotates, the current value at the angle θ can be given by the following equation based on the circuit equation under the assumption that the inductance is approximated by the chopping waveform as shown in FIG. 14A.

$$i = \frac{E/R}{1+A}\left[1 - \left[\frac{L_1 + K_L θ}{L_1 + K_L θ_{on}}\right]^{-\left(\frac{1+A}{A}\right)}\right] \quad (17)$$

where $K_L=(L_1-L_0)/θ_1$ and $A=K_L·ω/R$.

Here, $L_1$ is the maximum inductance of the winding, $L_0$ is the minimum inductance of the winding, R is the resistance of the winding, E is the power supply voltage, $i_m$ is the predetermined upper limit value of the current, and ω is the rotation speed. Also, if the rotor angle which gives the inductance $L_1$ or the rotor angle at which the salient pole of the stator faces perfectly to the salient pole of the rotor is set to θ=θ0, $θ_1$ is given as the angle at which the winding inductance starts to be the minimum value as the rotor rotates or the angle which is calculated by {(circular arc angle $θ_R$ of the salient pole of the rotor)+(circular arc angle $θ_S$ of the salient pole of the stator)}/2.

After substituting the condition of $θon_1$, i.e., the winding current $i=i_m$ at the rotor angle θ=0 into Eq.(17), $θon_1$ can be calculated by solving θon.

$$θ_{on1} = \frac{L_1}{K_L}\left[\left[1 - \frac{(1+A)·R·i_m}{E}\right]^{\frac{A}{1+A}} - 1\right] \quad (18)$$

Accordingly, when the power supply voltage E, the motor constants, the rotation speed ω and the predetermined upper limit value $i_m$ of the current are given, it is possible to maximize the power generation amount for any θoff by controlling θon within the range given by following equation.

$$\frac{L_1}{K_L}\left[\left[1 - \frac{(1+A)·R·i_m}{E}\right]^{\frac{A}{1+A}} - 1\right] \leq θ_{on} \leq 0 \quad (19)$$

Then, the start angle $θoff_1$ is obtained. If the last regenerative mode is started in the period in which the winding inductance is reduced as the rotor rotates, the current value at the angle θ can be given by the following equation based on the circuit equation under the assumption that the inductance is approximated by the chopping waveform as shown in FIG. 14A and also the current amplitude Δi is sufficiently small in contrast to the predetermined upper limit value $i_m$.

$$i = \frac{E/R}{1-A} - \left[\frac{E/R}{1-A} - i_m\right]\left[\frac{L_1 - K_L\theta}{L_1 - K_L\theta_{off}}\right]^{-\left(\frac{A-1}{A}\right)} \quad (20)$$

where $K_L = (L_1 - L_0)/\theta_1$ and $A = K_L \cdot \omega/R$.

Here, $L_1$ is the maximum inductance of the winding, $L_0$ is the minimum inductance of the winding, R is the resistance of the winding, E is the power supply voltage, $i_m$ is the predetermined upper limit value of the current, and $\omega$ is the rotation speed. Also, if the rotor angle which gives the inductance $L_1$ or the rotor angle at which the salient pole of the stator faces perfectly to the salient pole of the rotor is set to $\theta=0$, $\theta_1$ is given as the angle at which the winding inductance starts to be the minimum value as the rotor rotates or the angle which is calculated by {(circular arc angle $\theta_R$ of the salient pole of the rotor)+(circular arc angle $\theta_S$ of the salient pole of the stator)}/2.

After substituting the condition of $\theta$off$_1$, i.e., the winding current i=0 at the rotor angle $\theta=\theta_1$ into Eq.(20), $\theta$off$_1$ can be calculated by solving $\theta$off.

$$\theta_{off1} = \frac{1}{K_L}\left[L_1 - (L_1 - K_L\theta_1)\left[\frac{E}{E + (1-A)\cdot R \cdot i_m}\right]^{\frac{A}{A-1}}\right] \quad (21)$$

Accordingly, when the power supply voltage E, the motor constants, the rotation speed $\omega$ and the predetermined upper limit value $i_m$ of the current are given, it is possible to maximize the power generation amount for any $\theta$on by controlling $\theta$off within the range given by following equation.

$$\frac{1}{K_L}\left[L_1 - (L_1 - K_L\theta_1)\left[\frac{E}{E + (1-A)\cdot R \cdot i_m}\right]^{\frac{A}{A-1}}\right] \leq \theta_{off} \leq \theta_1 \quad (22)$$

The above-mentioned embodiments are set forth to make the understanding of the present invention easy, and are not set forth to limit the present invention. Therefore, respective elements disclosed on the above embodiments should be interpreted to include all design changes and equivalents which belong to the technical range of the present invention.

For example, the number of the salient poles of the stator and the rotor and the number of phase are not limited to those in the above embodiments, and others may be applied similarly.

It should be understood that many modifications and adaptations of the invention will become apparent to those skilled in the art and it is intended to encompass such obvious modifications and changes in the scope of the claims appended hereto.

The contents of Application No. TOKUGANHEI 11-190491, filed on Jul. 5, 1999, No. TOKUGAN 2000-93102, filed on Mar. 30, 2000, and No. TOKUGAN 2000-75489, filed on Mar. 17, 2000, in Japan are hereby incorporated by reference.

What is claimed is:

1. A method of controlling an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the method comprising:

executing, changeably as the rotor rotates, a supply mode for supplying power from a power supply to the windings, a reflux mode for setting both terminals of the windings to an identical potential, and a regenerative mode for recovering an electromotive force generated in the windings into the power supply, wherein the reflux mode replaces the supply mode when a rotation angle of the rotor reaches a predetermined first angle and the regenerative mode replaces the reflux mode when the rotation angle of the rotor reaches a predetermined second angle.

2. A method according to claim 1, wherein the supply mode starts in a period in which inductance of the windings rises as the rotor rotates and the reflux mode replaces the supply mode in a period in which the inductance of the windings is reduced as the rotor rotates.

3. A method according to claim 2, wherein after the reflux mode replaces the supply mode, the regenerative mode replaces the reflux mode before an end of the period in which the inductance of the windings is reduced as the rotor rotates.

4. A method of controlling an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the method comprising:

executing, changeably as the rotor rotates, a supply mode for supplying power from a power supply to the windings, a reflux mode for setting both terminals of the windings to an identical potential, and a regenerative mode for recovering an electromotive force generated in the windings into the power supply, wherein the reflux mode replaces the supply mode when a current flowing through the windings reaches a predetermined first current value and the regenerative mode replaces the reflux mode when the current flowing through the windings reaches a predetermined second current value which is higher than the first current value.

5. A method of controlling an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the method comprising:

executing, changeably as the rotor rotates, a supply mode for supplying power from a power supply to the windings, a reflux mode for setting both terminals of the windings to an identical potential, and a regenerative mode for recovering an electromotive force generated in the windings into the power supply, wherein after the supply mode is executed, a repetitive mode during which the regenerative mode and the reflux mode are repeated alternatively is executed.

6. A method according to claim 5, wherein the repetitive mode is executed in a period in which inductance of the windings is reduced as the rotor rotates.

7. A method according to claim 5, wherein a current flowing through the windings is detected, and in the repetitive mode, the regenerative mode is executed when the detected current reaches a first current value, and the reflux mode is executed when the detected current reaches a second current value which is lower than the first current value.

8. A method according to claim 7, wherein the first current value is set to be a value smaller than $-E/(R+(dL/d\theta)\cdot\omega)$, where $\omega$ is a number of rotations of the rotor per unit time and E is a power supply voltage.

9. A method according to claim 8, wherein a current amplitude $\Delta i$ which is a difference between the first current value and the second current value is set to satisfy $\Delta t \geq \Delta t_0$, where $\Delta t$ is a current change period in the repeating period in which the repetitive mode is executed, and $\Delta t_0$ is a minimum switching period of switching means connected to the windings to switch a mode.

10. A method according to claim 9, wherein the current amplitude $\Delta i$ is decided by $$\Delta t = \Delta i \cdot EL_m/(\alpha(E-\alpha))$$

where $\alpha = -(R + \omega(dL/d\theta))i_m$, and R is winding resistance, $\omega$ is a number of rotations of the rotor per unit time, E is a power supply voltage, $i_m$ is the first current value, $L_m$ is an instantaneous inductance of the windings, and $(dL/d\theta)$ is a rate of change of the inductance of the windings.

11. A method according to claim 9, wherein the current amplitude $\Delta i$ is set constant over the entire repeating period.

12. A method according to claim 11, wherein minimum inductance of the windings is used as the instantaneous inductance $L_m$ in an equation to calculate the current amplitude $\Delta i$.

13. A method according to claim 11, wherein inductance of the windings at an end point of time of the repeating period is used as the instantaneous inductance $L_m$ in an equation to calculate the current amplitude $\Delta i$.

14. A method according to claim 11, wherein inductance of the windings obtained when a rotation angle of the rotor is given by $\theta off - (\Delta t/2)\cdot\omega$ is used as the instantaneous inductance Lm in an equation to calculate the current amplitude $\Delta i$, where $\theta off$ is a rotation angle of the rotor at an end point of time of the repeating period.

15. A method according to claim 9, wherein the current amplitude $\Delta i$ is changed depending upon the rotation angle of the rotor such that the current change period in the repeating period becomes constant.

16. A method according to claim 5, wherein a switching period of the repetitive mode in which the regenerative mode and the reflux mode are switched is set constant, and the current value flowing through the windings is controlled to change a rate of a period of the regenerative mode to a period of the reflux mode in each switching period while keeping the switching period constant.

17. A method according to claim 5, wherein the repetitive mode is executed only when a number of rotations of the rotor per unit time is larger than $-R/(dL/d\theta)$, where R is resistance of the windings and $(dL/d\theta)$ is a rate of change of the inductance of the windings.

18. A method according to claim 5, wherein the supply mode or the first supply mode is started at an angle prior to a start angle at which the period during which the inductance of the windings is reduced is started and at the angle such that the current flowing through the windings reaches the first current value in a period during which the inductance of the windings is reduced as the rotor rotates.

19. A method according to claim 18, wherein an angle represented by $(\theta_R - \theta_S)/2$ is used as an angle at which a period during which the inductance is reduced is started, where $\theta_R$ is a circular arc angle of the salient pole of the rotor, $\theta_S$ is a circular arc angle of the salient pole of the stator, and the angle of the rotor at a point of time when the salient poles of the stator and the salient poles of the rotor faces perfectly to each other is set to zero.

20. A method according to claim 19, wherein the start angle $\theta on$ of the supply mode is set in a range represented by $$\frac{L_1}{K_L}\left[\left[1 - \frac{(1+A)\cdot R \cdot i_m}{E}\right]^{\frac{A}{1+A}} - 1\right] \leq \theta_{on} \leq 0$$

where $K_L = (L_1 - L_0)/\theta_1$, $A = K_L \cdot \omega/R$, $L_1$ is maximum inductance of the windings, $L_0$ is minimum inductance of the windings, R is resistance of the windings, E is a power supply voltage, $i_m$ is a first current value, $\omega$ is a rotation speed, and an angle at which a period during which the inductance of the windings is reduced is started is 0, and an angle at which the period is ended is $\theta_1$.

21. A method according to claim 5, wherein the last regenerative mode which is started at a same time when the repetitive mode is ended is started at an angle prior to an end angle at which the period during which the inductance of the windings is reduced is ended and at the angle such that the current flowing through the windings reaches zero after a period during which the inductance of the windings is reduced as the rotor rotates has been lapsed.

22. A method according to claim 21, wherein an angle represented by $(\theta_R + \theta_S)/2$ is used as an angle at which a period during when the inductance is reduced is ended, where $\theta_R$ is a circular arc angle of the salient pole of the rotor, $\theta_S$ is a circular arc angle of the salient pole of the stator, and the angle of the rotor at a point of time when the salient poles of the stator and the salient poles of the rotor faces perfectly to each other is set to zero.

23. A method according to claim 21, wherein the start angle $\theta off$ of the last regenerative mode is set in a range represented by $$\frac{1}{K_L}\left[L_1 - (L_1 - K_L\theta_1)\left[\frac{E}{E + (1-A)\cdot R \cdot i_m}\right]^{\frac{A}{A-1}}\right] \leq \theta_{off} \leq \theta_1$$

where $K_L = (L_1 - L_0)/\theta_1$, $A = K_L \cdot \omega/R$, $L_1$ is maximum inductance of the windings, $L_0$ is minimum inductance of the windings, R is resistance of the windings, E is a power supply voltage, $i_m$ is a first current value, $\omega$ is a rotation speed, and an angle at which a period during which the inductance of the windings is reduced is started is 0, and an angle at which the period is ended is $\theta_1$.

24. A method of controlling an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the method comprising:

executing a first supply mode for supplying power from a power supply to the windings; and then executing a repetitive mode during which the regenerative mode for recovering an electromotive force generated in the windings into the power supply and a second supply mode for supplying the power from the power supply to the windings are repeated alternatively.

25. A method according to claim 24, wherein the repetitive mode is executed in a period in which inductance of the windings is reduced as the rotor rotates.

26. A method according to claim 24, wherein a current flowing through the windings is detected, and in the repetitive mode, the regenerative mode is executed when the detected current reaches a first current value, and the reflux mode or the second supply mode is executed when the detected current reaches a second current value which is lower than the first current value.

27. A method according to claim 26, wherein a current amplitude Δi which is a difference between the first current value and the second current value is set to satisfy $\Delta t \geq \Delta t_0$, where Δt is a current change period in the repeating period in which the repetitive mode is executed, and $\Delta t_0$ is a minimum switching period of switching means connected to the windings to switch a mode.

28. A method according to claim 27, wherein the current amplitude Δi is decided by $$\Delta t = \Delta i \cdot 2EL_m/(E^2 - \alpha^2)$$

where $\alpha = -(R + \omega(dL/d\theta))i_m$, and R is winding resistance, ω is a number of rotations of the rotor per unit time, E is a power supply voltage, $i_m$ is the first current value, $L_m$ is an instantaneous inductance of the windings, and (dL/dθ) is a rate of change of the inductance of the windings.

29. A method according to claim 27, wherein the current amplitude Δi is set constant over the entire repeating period.

30. A method according to claim 29, wherein minimum inductance of the windings is used as the instantaneous inductance $L_m$ in an equation to calculate the current amplitude Δi.

31. A method according to claim 29, wherein inductance of the windings at an end point of time of the repeating period is used as the instantaneous inductance $L_m$ in an equation to calculate the current amplitude Δi.

32. A method according to claim 29, wherein inductance of the windings obtained when a rotation angle of the rotor is given by $\theta \text{off} - (\Delta t/2) \cdot \omega$ is used as the instantaneous inductance Lm in an equation to calculate the current amplitude Δi, where θoff is a rotation angle of the rotor at an end point of time of the repeating period.

33. A method according to claim 27, wherein the current amplitude Δi is changed depending upon the rotation angle of the rotor such that the current change period in the repeating period becomes constant.

34. A method according to claim 33, wherein the current amplitude Δi is linearly changed from $\Delta i_1$ to $\Delta i_0$ as the rotation angle of the rotor changes from θm to θoff, where $\Delta i_1$ is the current amplitude calculated by using the inductance at the rotation angle θm of the rotor when the current of the windings reaches first the first current value as the instantaneous inductance $L_m$ in an equation to calculate the current amplitude Δi, and $\Delta i_0$ is the current amplitude calculated by using the inductance at the rotation angle θoff of the rotor at an end point of time of the repeating period as the instantaneous inductance $L_m$ in an equation to calculate the current amplitude Δi.

35. A method according to claim 24, wherein a switching period in which the regenerative mode and the second supply mode are switched is set constant in the repetitive mode, and the current value flowing through the windings is controlled by changing a rate between a regenerative mode time and a second supply mode time in one switching period.

36. A method according to claim 24, wherein the first supply mode is started at an angle prior to a start angle at which the period during which the inductance of the windings is reduced is started and at the angle such that the current flowing through the windings reaches the first current value in a period during which the inductance of the windings is reduced as the rotor rotates.

37. A method according to claim 36, wherein an angle represented by $(\theta_R - \theta_S)/2$ is used as an angle at which a period during which the inductance is reduced is started, where $\theta_R$ is a circular arc angle of the salient pole of the rotor, $\theta_S$ is a circular arc angle of the salient pole of the stator, and the angle of the rotor at a point of time when the salient poles of the stator and the salient poles of the rotor faces perfectly to each other is set to zero.

38. A method according to claim 37, wherein the start angle θon of the first supply mode is set in a range represented by $$\frac{L_1}{K_L}\left[\left[1 - \frac{(1+A) \cdot R \cdot i_m}{E}\right]^{\frac{A}{1+A}} - 1\right] \leq \theta_{on} \leq 0$$

where $K_L = (L_1 - L_0)/\theta_1$, $A = K_L \cdot \omega/R$, $L_1$ is maximum inductance of the windings, $L_0$ is minimum inductance of the windings, R is resistance of the windings, E is a power supply voltage, $i_m$ is a first current value, ω is a rotation speed, and an angle at which a period during which the inductance of the windings is reduced is started is 0, and an angle at which the period is ended is $\theta_1$.

39. A method according to claim 24, wherein the last regenerative mode which is started at a same time when the repetitive mode is ended is started at an angle prior to an end angle at which the period during which the inductance of the windings is reduced is ended and at the angle such that the current flowing through the windings reaches zero after a period during which the inductance of the windings is reduced as the rotor rotates has been lapsed.

40. A method according to claim 39, wherein an angle represented by $(\theta_R + \theta_S)/2$ is used as an angle at which a period during when the inductance is reduced is ended, where $\theta_R$ is a circular arc angle of the salient pole of the rotor, $\theta_S$ is a circular arc angle of the salient pole of the stator, and the angle of the rotor at a point of time when the salient poles of the stator and the salient poles of the rotor faces perfectly to each other is set to zero.

41. A method according to claim 39, wherein the start angle θoff of the last regenerative mode is set in a range represented by $$\frac{1}{K_L}\left[L_1 - (L_1 - K_L\theta_1)\left[\frac{E}{E + (1-A) \cdot R \cdot i_m}\right]^{\frac{A}{A-1}}\right] \leq \theta_{off} \leq \theta_1$$

where $K_L = (L_1 - L_0)/\theta_1$, $A = K_L \cdot \omega/R$, $L_1$ is maximum inductance of the windings, $L_0$ is minimum inductance of the windings, R is resistance of the windings, E is a power supply voltage, $i_m$ is a first current value, ω is a rotation speed, and an angle at which a period during which the inductance of the windings is reduced is started is 0, and an angle at which the period is ended is $\theta_1$.

42. A method according to claim 39, wherein the start angle θoff of the last regenerative mode is set in a range represented by $$\frac{1}{K_L}\left[L_1 - (L_1 - K_L\theta_1)\left[\frac{E}{E + (1-A) \cdot R \cdot i_m}\right]^{\frac{A}{A-1}}\right] \leq \theta_{off} \leq \theta_1$$

where $K_L = (L_1 - L_0)/\theta_1$, $A = K_L \cdot \omega/R$, $L_1$ is maximum inductance of the windings, $L_0$ is minimum inductance of the windings, R is resistance of the windings, E is a power supply voltage, $i_m$ is a first current value, ω is a rotation speed, and an angle at which a period during which the inductance of the windings is reduced is started is 0, and an angle at which the period is ended is $\theta_1$.

43. A method of controlling an SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the method comprising:

executing, changeably as the rotor rotates, a supply mode for supplying power from a power supply to the windings, a reflux mode for setting both terminals of the windings to an identical potential, and a regenerative mode for recovering an electromotive force generated in the windings into the power supply, wherein after a first supply mode is executed, a first repetitive mode during which the regenerative mode and a second supply mode are repeated alternatively and a second repetitive mode during which the regenerative mode and the reflux mode are repeated alternatively are mixedly executed.

44. A method according to claim 43, wherein the first repetitive mode and the second repetitive mode are executed in that order in a period in which inductance of the windings is reduced as the rotor rotates.

45. A method according to claim 43, wherein a current flowing through the windings is detected, and in the first or second repetitive mode, the regenerative mode is executed when the detected current reaches a first current value, and the reflux mode or the second supply mode is executed when the detected current reaches a second current value which is lower than the first current value.

46. A method according to claim 45, wherein a current amplitude $\Delta i$ which is a difference between the first current value and the second current value is set to satisfy $\Delta t \geq \Delta t_0$, where $\Delta t$ is a current change period in the repeating period in which the repetitive mode is executed, and $\Delta t_0$ is a minimum switching period of switching means connected to the windings to switch a mode.

47. A method according to claim 46, wherein the current amplitude $\Delta i$ is decided by $$\Delta t = \Delta i \cdot 2EL_m/(E^2-\alpha^2)$$

where $\alpha = -(R+\omega(dL/d\theta))i_m$, and R is winding resistance, $\omega$ is a number of rotations of the rotor per unit time, E is a power supply voltage, $i_m$ is the first current value, $L_m$ is an instantaneous inductance of the windings, and $(dL/d\theta)$ is a rate of change of the inductance of the windings.

48. A method according to claim 46, wherein the current amplitude $\Delta i$ is set constant over the entire repeating period.

49. A method according to claim 48, wherein minimum inductance of the windings is used as the instantaneous inductance $L_m$ in an equation to calculate the current amplitude $\Delta i$.

50. A method according to claim 48, wherein inductance of the windings at an end point of time of the repeating period is used as the instantaneous inductance $L_m$ in an equation to calculate the current amplitude $\Delta i$.

51. A method according to claim 48, wherein inductance of the windings obtained when a rotation angle of the rotor is given by $\theta off - (\Delta t/2)\cdot\omega$ is used as the instantaneous inductance Lm in an equation to calculate the current amplitude $\Delta i$, where $\theta$off is a rotation angle of the rotor at an end point of time of the repeating period.

52. A method according to claim 46, wherein the current amplitude $\Delta i$ is changed depending upon the rotation angle of the rotor such that the current change period in the repeating period becomes constant.

53. A method according to claim 52, wherein the current amplitude $\Delta i$ is linearly changed from $\Delta i_1$ to $\Delta i_0$ as the rotation angle of the rotor changes from $\theta$m to $\theta$off, where $\Delta i_1$ is the current amplitude calculated by using the inductance at the rotation angle $\theta$m of the rotor when the current of the windings reaches first the first current value as the instantaneous inductance $L_m$ in an equation to calculate the current amplitude $\Delta i$, and $\Delta i_0$ is the current amplitude calculated by using the inductance at the rotation angle $\theta$off of the rotor at an end point of time of the repeating period as the instantaneous inductance $L_m$ in an equation to calculate the current amplitude $\Delta i$.

54. A method according to claim 43, wherein a switching period in which the regenerative mode and the reflux mode are switched is set constant in the repetitive mode, and the current value flowing through the windings is controlled by changing a rate between a regenerative mode time and a reflux mode or second supply mode time in one switching period.

55. A method according to claims 43, wherein the first supply mode is started at an angle prior to a start angle at which the period during which the inductance of the windings is reduced is started and at the angle such that the current flowing through the windings reaches the first current value in a period during which the inductance of the windings is reduced as the rotor rotates.

56. A method according to claim 55, wherein an angle represented by $(\theta_R-\theta_S)/2$ is used as an angle at which a period during which the inductance is reduced is started, where $\theta_R$ is a circular arc angle of the salient pole of the rotor, $\theta_S$ is a circular arc angle of the salient pole of the stator, and the angle of the rotor at a point of time when the salient poles of the stator and the salient poles of the rotor faces perfectly to each other is set to zero.

57. A method according to claim 56, wherein the start angle $\theta$on of the first supply mode is set in a range represented by $$\frac{L_1}{K_L}\left[\left[1-\frac{(1+A)\cdot R\cdot i_m}{E}\right]^{\frac{A}{1+A}}-1\right] \leq \theta_{on} \leq 0$$

where $K_L=(L_1-L_0)/\theta_1$, $A=K_L\cdot\omega/R$, $L_1$ is maximum inductance of the windings, $L_0$ is minimum inductance of the windings, R is resistance of the windings, E is a power supply voltage, $i_m$ is a first current value, $\omega$ is a rotation speed, and an angle at which a period during which the inductance of the windings is reduced is started is 0, and an angle at which the period is ended is $\theta_1$.

58. A method according to claim 43, wherein the last regenerative mode which is started at a same time when the repetitive mode is ended is started at an angle prior to an end angle at which the period during which the inductance of the windings is reduced is ended and at the angle such that the current flowing through the windings reaches zero after a period during which the inductance of the windings is reduced as the rotor rotates has been lapsed.

59. A method according to claim 58, wherein an angle represented by $(\theta_R+\theta_S)/2$ is used as an angle at which a period during which the inductance is reduced is ended, where $\theta_R$ is a circular arc angle of the salient pole of the rotor, $\theta_S$ is a circular arc angle of the salient pole of the stator, and the angle of the rotor at a point of time when the salient poles of the stator and the salient poles of the rotor faces perfectly to each other is set to zero.

60. An SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the SR motor comprising:

a first switch configured to connect selectively start terminals of the windings to one polarity of a power supply;

a second switch configured to connect selectively end terminals of the windings to other polarity of the power supply;

a first diode interposed between the start terminals of the windings and the other polarity of the power supply, and configured to flow a current only in a direction toward the start terminals;

a second diode interposed between the end terminals of the windings and one polarity of the power supply, and configured to flow the current only in a direction toward one polarity of the power supply; and a controller configured to control to execute, changeably as the rotor rotates, a supply mode in which the first switch and the second switch are connected simultaneously, a reflux mode in which one of the first switch and the second switch is connected and other of them is cut off, and a regenerative mode in which the first switch and the second switch are cut off simultaneously, wherein after the supply mode is executed, a repetitive mode during which the regenerative mode and the reflux mode are repeated alternatively is executed.

61. An SR motor according to claim 60, further comprising:

a current detector configured to detect the current flowing through the windings, wherein the controller controls to execute the regenerative mode when a detection current detected by the current detector reaches a first current value and to execute the reflux mode when the detection current reaches a second current value which is lower than the first current value.

62. An SR motor according to claim 61, wherein the controller sets a current amplitude $\Delta i$ which is a difference between the first current value and the second current value to satisfy $\Delta t \geq -\Delta t_0$, where $\Delta t$ is a current change period in a repeating period during which the regenerative mode and the reflux mode are repeated, and $\Delta t_0$ is a minimum switching period of the first switch and the second switch.

63. An SR motor according to claim 62, wherein the current amplitude $\Delta i$ is set constant over the entire repeating period.

64. An SR motor according to claim 62, wherein the current amplitude $\Delta i$ is changed depending upon a rotation angle of the rotor such that the current change period in the repeating period becomes constant.

65. An SR motor according to claim 61, wherein the supply mode is started at an angle at an angle prior to a start angle at which the period during which the inductance of the windings is reduced is started and at the angle such that the current flowing through the windings reaches the first current value in a period during which the inductance of the windings is reduced as the rotor rotates.

66. An SR motor according to claim 61, wherein the last regenerative mode which is started at a same time when the repetitive mode is ended is started at an angle prior to an end angle at which the period during which the inductance of the windings is reduced is ended and at the angle such that the current flowing through the windings reaches zero after a period during which the inductance of the windings is reduced as the rotor rotates has been lapsed.

67. An SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the SR motor comprising:

a first switch configured to connect selectively start terminals of the windings to one polarity of a power supply;

a second switch configured to connect selectively end terminals of the windings to other polarity of the power supply;

a first diode interposed between the start terminals of the windings and the other polarity of the power supply, and configured to flow a current only in a direction toward the start terminals;

a second diode interposed between the end terminals of the windings and one polarity of the power supply, and configured to flow the current only in a direction toward one polarity of the power supply; and a controller configured to control to execute a first supply mode in which the first switch and the second switch are connected simultaneously, and then execute a repetitive mode in which the regenerative mode in which the first switch and the second switch are cut off simultaneously and a second supply mode in which the first switch and the second switch are connected simultaneously.

68. An SR motor which includes a stator having a plurality of salient poles, windings wound around the plurality of salient poles and generating magnetic fields in the plurality of salient poles, and a rotor having another plurality of salient poles, a number of the salient poles of the rotor being determined depending upon a number of the salient poles of the stator, the SR motor comprising:

a first switch configured to connect selectively start terminals of the windings to one polarity of a power supply;

a second switch configured to connect selectively end terminals of the windings to other polarity of the power supply;

a first diode interposed between the start terminals of the windings and the other polarity of the power supply, and configured to flow a current only in a direction toward the start terminals;

a second diode interposed between the end terminals of the windings and one polarity of the power supply, and configured to flow the current only in a direction toward one polarity of the power supply; and a controller configured to control to execute, changeably as the rotor rotates, a supply mode in which the first switch and the second switch are connected simultaneously, a reflux mode in which one of the first switch and the second switch is connected and other of them is cut off, and a regenerative mode in which the first switch and the second switch are cut off simultaneously, wherein after a first supply mode is executed, a first repetitive mode during which the regenerative mode and a second supply mode are repeated alternatively and a second repetitive mode during which the regenerative mode and the reflux mode are repeated alternatively are mixedly executed.

* * * * *